(12) United States Patent
Ettes et al.

(10) Patent No.: US 11,303,152 B2
(45) Date of Patent: Apr. 12, 2022

(54) WIRELESS POWER TRANSFER USING PARAMETERS

(71) Applicant: KONINKLIJKE PHILIPS N.V., Eindhoven (NL)

(72) Inventors: Wilhelmus Gerardus Maria Ettes, Leeuwarden (NL); Andries Van Wageningen, Wijlre (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 17/054,862

(22) PCT Filed: May 15, 2019

(86) PCT No.: PCT/EP2019/062540
§ 371 (c)(1),
(2) Date: Nov. 12, 2020

(87) PCT Pub. No.: WO2019/219778
PCT Pub. Date: Nov. 21, 2019

(65) Prior Publication Data
US 2021/0218282 A1    Jul. 15, 2021

(30) Foreign Application Priority Data
May 16, 2018   (EP) .................................. 18172577

(51) Int. Cl.
*H02J 50/00*     (2016.01)
*H02J 50/12*     (2016.01)
(Continued)

(52) U.S. Cl.
CPC ............. *H02J 50/00* (2016.02); *H02J 50/12* (2016.02); *H02J 50/40* (2016.02); *H02J 50/60* (2016.02); *H04B 5/00* (2013.01); *H04B 5/0037* (2013.01)

(58) Field of Classification Search
CPC .................................. H02J 50/00; H04B 5/00
See application file for complete search history.

(56) References Cited

U.S. PATENT DOCUMENTS 9,479,013 B2   10/2016 Joye et al.
9,625,501 B2    4/2017 Van Wageningen
(Continued)

FOREIGN PATENT DOCUMENTS

WO    WO-2014108785 A1 *  7/2014    .............. H02J 7/025

OTHER PUBLICATIONS

QI Specification Feb. 2017.
International Search Report and Written Opinion from PCT/EP2019/062540 dated May 15, 2019.

*Primary Examiner* — Adi Amrany

(57) ABSTRACT

A power receiver receives a wireless power transfer from a power transfer signal generated by a wireless power transmitter during a power transfer phase. The power transfer signal employing a repeating time frame during the power transfer phase where the frame comprises at least a power transfer time interval and a foreign object detection time interval. The power receiver comprises a synchronizer (311) which synchronizes a local time reference to the repeating time frame and a load controller (309) which disconnects a load (303) during at least part of the foreign object time detection time intervals during at least part of the power transfer phase. The timing of the disconnecting is dependent on the local time reference. A mode controller (313) switches between a first operational mode and a second operational mode for the power transfer time intervals in response to a reliability measure for the synchronization.

20 Claims, 9 Drawing Sheets

(51) Int. Cl.
*H02J 50/40* (2016.01)
*H02J 50/60* (2016.01)
*H04B 5/00* (2006.01)

(56) References Cited

U.S. PATENT DOCUMENTS

| | | |
|---|---|---|
| 10,103,584 B2 | 10/2018 | Van Wageningen et al. |
| 10,158,255 B2 | 12/2018 | Stevens et al. |
| 2007/0216392 A1 | 9/2007 | Stevens et al. |
| 2009/0174263 A1 | 7/2009 | Baarman et al. |
| 2009/0174264 A1 | 7/2009 | Onishi et al. |
| 2013/0094598 A1 | 4/2013 | Bastami |
| 2014/0327393 A1 | 11/2014 | Lee et al. |
| 2016/0126747 A1 | 5/2016 | Kato |
| 2018/0219416 A1 | 8/2018 | Van Wageningen |
| 2020/0212725 A1 | 7/2020 | Van Wageningen |
| 2020/0280220 A1 | 9/2020 | Van Wageningen |

* cited by examiner

WIRELESS POWER TRANSFER USING PARAMETERS

CROSS-REFERENCE TO PRIOR APPLICATIONS

This application is the U.S. National Phase application under 35 U.S.C. § 371 of International Application No. PCT/EP2019/062540, filed on May 15, 2019, which claims the benefit of EP Patent Application No. EP 18172577.1, filed on May 16, 2018. These applications are hereby incorporated by reference herein.

FIELD OF THE INVENTION

The invention relates to operation of a wireless power transfer system and in particular, but not exclusively, to foreign object detection in a wireless power transfer system.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

In power transfer systems, such as Qi, the electromagnetic field generated to transfer the required levels of power to the power receiver is often very substantial. The presence of such a strong field may in many situations have an impact on the surroundings.

For example, a potential problem with wireless power transfer is that power may unintentionally be transferred to e.g. metallic objects that happen to be in the vicinity of the power transmitter. For example, if a foreign object, such as e.g. a coin, key, ring etc., is placed upon the power transmitter platform arranged to receive a power receiver, the magnetic flux generated by the transmitter coil will introduce eddy currents in the metal objects which will cause the objects to heat up. The heat increase may be very significant and may be highly disadvantageous.

In order to reduce the risk of such scenarios arising, it has been proposed to introduce foreign object detection where the power transmitter can detect the presence of a foreign object and reduce the transmit power and/or generate a user alert when a positive detection occurs. For example, the Qi system includes functionality for detecting a foreign object, and for reducing power if a foreign object is detected. Specifically, Qi specification version 1.2.1, section 11 describes various methods of detecting a foreign object.

One method to detect such foreign objects is disclosed in WO2015018868A1. Another example is provided in WO 2012127335 which discloses an approach based on determining unknown power losses. In the approach, both the power receiver and the power transmitter measure their power, and the receiver communicates its measured received power to the power transmitter. When the power transmitter detects a significant difference between the power sent by the transmitter and the power received by the receiver, an unwanted foreign object may potentially be present, and the power transfer may be reduced or aborted for safety reasons. This power loss method requires synchronized accurate power measurements performed by the power transmitter and the power receiver.

For example, in the Qi power transfer standard, the power receiver estimates its received power e.g. by measuring the rectified voltage and current, multiplying them and adding an estimate of the internal power losses in the power receiver (e.g. losses of the rectifier, the receiver coil, metal parts being part of the receiver etc.). The power receiver reports the determined received power to the power transmitter with a minimum rate of e.g. every four seconds.

The power transmitter estimates its transmitted power, e.g. by measuring the DC input voltage and current of the inverter, multiplying them and correcting the result by subtracting an estimation of the internal power losses in the transmitter, such as e.g. the estimated power loss in the inverter, the primary coil, and metal parts that are part of the power transmitter.

The power transmitter can estimate the power loss by subtracting the reported received power from the transmitted power. If the difference exceeds a threshold, the transmitter will assume that too much power is dissipated in a foreign object, and it can then proceed to terminate the power transfer (or to adjust the operating parameters accordingly, e.g. restrict the power transfer to be below a given level).

Alternatively, it has been proposed to measure the quality or Q-factor of the resonant circuit formed by the primary and secondary coils together with the corresponding capacitances and resistances. A reduction in the measured Q-factor may be indicative of a foreign object being present.

In practice, it tends to be difficult to achieve sufficient detection accuracy using the methods described in the Qi specification. This difficulty is exacerbated by a number of uncertainties about the specific current operating conditions.

For example, a particular problem is the potential presence of friendly metals (i.e. metal parts of the device that embodies the power receiver or the power transmitter) as the magnetic and electrical properties of these may be unknown (and vary between different devices) and therefore may be difficult to compensate for.

Further, undesirable heating may result from even relatively small amounts of power being dissipated in a metallic foreign object. Therefore, it is necessary to detect even a small power discrepancy between the transmitted and received power, and this may be particularly difficult when the power levels of the power transfer increase.

The Q factor degradation approach may in many scenarios have a better sensitivity for detecting the presence of metal objects. However, it may still not provide sufficient accuracy and e.g. may also suffer from the influence of friendly metal.

The performance of the foreign object detection is subject to the specific operating conditions that are present when the test is actually performed. For example, if, as described in the Qi specification, a measurement for foreign object detection is performed in the Selection Phase of a power transfer initialization process, the signal that the power transmitter provides for the measurement must be small enough to prevent that it wakes up the power receiver. However, for such a small signal, the signal/noise ratio is typically poor, resulting in reduced accuracy of the measurement.

The requirement for a small measurement signal may result in other disadvantageous effects. A power receiver exposed to a small measurement signal may exhibit a leakage current that depends on the level of the measurement signal, the coupling between the primary and secondary coil, and the charging state of a capacitor at the output of the rectifier. This leakage current can therefore be different depending on the actual conditions. Since leakage current influences the reflected impedance at the power transmitter coil, the measurement of the quality factor will also depend on the specific current conditions.

Another issue is that foreign object detection is typically a very sensitive test where it is desired that relatively small changes caused by the presence of a foreign object is detected in an environment with possibly a large variation of the operating conditions and scenarios for which the test is being performed.

Accordingly, current algorithms tend to be suboptimal and may in some scenarios and examples provide less than optimum performance. In particular, they may result in the presence of foreign objects not being detected, or in false detections of foreign objects when none are present.

The difficulties of accurate foreign object detection are particularly difficult in scenarios wherein the power level of the power transfer signal is high and/or when it varies. Thus, foreign object detection is particularly difficult during the power transfer phase, and especially for power receivers that represent a large and varying load. Further, there tends to be conflicting requirements for the foreign object detection and the power transfer and indeed the power transfer often tends to interfere with the foreign object detection. However, modifying the power transfer operation to improve the foreign object detection tends to have a detrimental impact on the power transfer.

Other operations of the power transfer system may furthermore be sensitive to such effects. For example, in many situations, communication between the power transmitter and power receiver may be negatively affected by large loads, and in particular by large load variations.

In many systems, communication from the power receiver to the power transmitter may use load modulation where a load of the power transfer signal is varied in dependence on the data to be transmitted. However, such load modulation may be difficult to detect if the power transfer loading of the power transfer signal varies at the same time. Similarly, communication from the power transmitter to the power receiver may be achieved by modulating the power transfer signal (e.g. amplitude or frequency modulation) but interference to such modulation may be caused by variations in the parameters of the power transfer signal due to a varying load.

Indeed, even if a completely separate carrier is used for communication, such as a NFC communication link, a very large and varying electromagnetic field caused by the power transfer signal may cause substantial interference despite being in a very different frequency band.

Thus, the presence of the power transfer signal, and the loading thereof, may have detrimental impact on other operations, such as foreign object detection and communication operations.

Hence, an improved operation for a power transfer system would be advantageous, in particular, an approach allowing increased flexibility, reduced cost, reduced complexity, improved foreign object detection, improved communication, improved support for different loads, improved adaptability, backwards compatibility, reduced impact on the power transfer operation, improved power transfer operation, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided power receiver for receiving wireless power transfer from a power transfer signal from a wireless power transmitter during a power transfer phase, the power transfer signal during the power transfer phase employing a repeating time frame comprising at least a power transfer time interval and a foreign object detection time interval; the power receiver comprising: a synchronizer for synchronizing a local time reference to the repeating time frame; a load controller for disconnecting a load during at least part of the foreign object time detection time intervals during at least part of the power transfer phase, a timing of the disconnecting being dependent on the local time reference; a mode controller for switching between a first operational mode and a second operational mode for the power transfer time intervals in response to a reliability measure for the synchronization, wherein different power transfer parameters are employed in the first operational mode and in the second operational mode.

The invention may provide improved performance in many embodiments, and may provide an overall improved power transfer operation in many systems and embodiments.

For example, in many embodiments, foreign object detection may be achieved by performing such detections during time intervals created to provide particularly advantageous conditions.

The approach may in many embodiments reduce complexity, and may in many systems provide a high degree of backwards compatibility. Specifically, the approach may be particularly suitable for improving foreign object detection in Qi wireless power transfer systems e.g. operating in accordance with version 1.2 or earlier of the Qi Specifications.

The invention may in many embodiments provide a more reliable and/or safe operation. In particular, it may mitigate and reduce the risk of over-voltage conditions occurring when disconnecting the load. For example, the power level of the power transfer signal during the power transfer time intervals may be reduced when the reliability measure indicates that synchronization is not reliable thereby reducing the risk of unacceptable over-voltage being induced if disconnection occurs during a power transfer time interval.

In many embodiments, a duration of the foreign object detection time interval is no more than 5%, 10%, or 20% of the duration of the time frame. In many embodiments, the duration of the foreign object detection time interval(s) is no less than 70%, 80%, or 90% of the time frame.

During the foreign object detection time interval, the power level of the power transfer signal may be reduced corresponding to the level of power being transferred from the power transmitter to the power receiver being reduced. During the foreign object detection time interval, a power level of power transferred from the power transmitter to the power receiver may be reduced relative to a power level of power transferred from the power transmitter to the power receiver during the power transfer time interval. The power level, and references to power and power level, may specifically be considered to relate to the real power (I·U·Cos φ).

The first and second operational modes may employ different power transfer parameters by at least one of: applying a different limit for a signal level of the power transfer signal in the first and second operational modes; employing a different load of the power transfer signal in the first and second operational modes; and applying a different limit to rate of changes for power levels of the power transfer signal in the first and second operational modes. The synchronizer may be arranged to generate the reliability measure for the synchronization.

In accordance with an optional feature of the invention, the synchronizer is arranged to perform a synchronization of the local time reference to the repeating time frame when entering the power transfer phase, the mode controller is arranged to control the power receiver to operate in the first operational mode when entering the power transfer phase, and to switch the power receiver to the second operational mode in response to a detection that the reliability measure for the synchronization exceeds a threshold.

This may provide improved operation in many embodiments including typically a more reliable and/or safe power transfer operation and/or improved foreign object detection. The approach may in particular allow improved power transfer initialation for scenarios wherein the power receiver seeks to extract a large amount of power during the power transfer phase.

In accordance with an optional feature of the invention, the power receiver further comprises a signal level controller for transmitting signal level requests for the power transfer signal to the power transmitter; the signal level controller being arranged to control the signal level of the power transfer signal during the power transfer intervals to differ from a signal level of the power transfer signal during the foreign object detection intervals when in the first operational mode; and wherein the synchronizer is arranged to synchronize in response to signal variations between the power transfer time intervals and the foreign object time intervals.

This may provide improved performance in many embodiments and may provide a reliable initial timing adaptation and synchronization.

In accordance with an optional feature of the invention, the synchronizer is arranged to determine the reliability measure for the synchronization in response to a duration of operation in the first mode of operation.

This may provide improved performance in many embodiments.

In accordance with an optional feature of the invention, the power receiver further comprises an initiator which is arranged to determine a set of parameters for the foreign object time intervals by communicating with the power transmitter prior to entering the power transfer phase, the set of parameters comprising at least one of: a. a duration of the foreign object time intervals; b. an interval between foreign object time intervals; and c. a signal level for the foreign object detection intervals.

This may provide for a more reliable operation and may in particular allow adaptation of the operation to the specific conditions.

In accordance with an optional feature of the invention, the synchronizer is arranged to perform the synchronization based on the set of parameters.

This may provide improved performance and may allow an advantageous adaptation of the operating conditions with parameters being determined by negotiation and subsequent adjustment by e.g. automatic synchronization.

In accordance with an optional feature of the invention, the synchronizer is arranged to determine the reliability measure in response to a comparison of a timing parameter for the foreign object detection time intervals determined from the local time reference and corresponding timing parameter of the set of parameters.

This may provide a particularly advantageous determination of the reliability measure.

In accordance with an optional feature of the invention, the power receiver is arranged to control the power transmitter to limit a signal level of the power transfer signal to a level which is lower when in the first mode of operation than when in the second mode of operation.

This may provide improved and/or more reliable operation in many embodiments and may in particular mitigate and/or reduce the risk of over-voltage conditions.

In accordance with an optional feature of the invention, the load controller is arranged to disconnect a load from the power transfer signal during power transfer time intervals when in the first mode of operation but not when in the second mode of operation.

This may provide improved operation.

In accordance with an optional feature of the invention, the power receiver further comprises a power level controller for transmitting power level requests for the power transfer signal to the power transmitter; the power level controller being arranged to limit a rate of change for power levels when in the first mode of operation to a lower level than when in the second mode of operation In accordance with an optional feature of the invention, the synchronizer is arranged to determine the reliability measure for the synchronization in response to a comparison of signal levels for the power transfer signal during power transfer time intervals and foreign object time intervals.

This may provide a particularly advantageous determination of the reliability measure.

In accordance with an optional feature of the invention, the mode controller is arranged to switch the power receiver from the second operational mode to the first operational mode in response to a detection that the reliability measure for the synchronization is below a threshold.

In accordance with an optional feature of the invention, the load controller is arranged to reconnect the load during the foreign object time detection time intervals during at least part of the power transfer phase, a timing of the reconnecting being dependent on the local time reference.

In accordance with an optional feature of the invention, the power receiver further comprises a current restrictor for restricting a current to the load when reconnecting the load.

According to an aspect of the invention there is provided a method of operation for a power receiver receiving wireless power transfer from a power transfer signal from a wireless power transmitter during a power transfer phase, the power transfer signal during the power transfer phase employing a repeating time frame comprising at least a power transfer time interval and a foreign object detection time interval; the method comprising: synchronizing a local time reference to the repeating time frame; disconnecting a load during at least part of the foreign object time detection time intervals during at least part of the power transfer phase, a timing of the disconnecting being dependent on the local time reference; and switching between a first operational mode and a second operational mode for the power transfer time intervals in response to a reliability measure for the synchronization, wherein different power transfer parameters are employed in the first operational mode and in the second operational mode.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
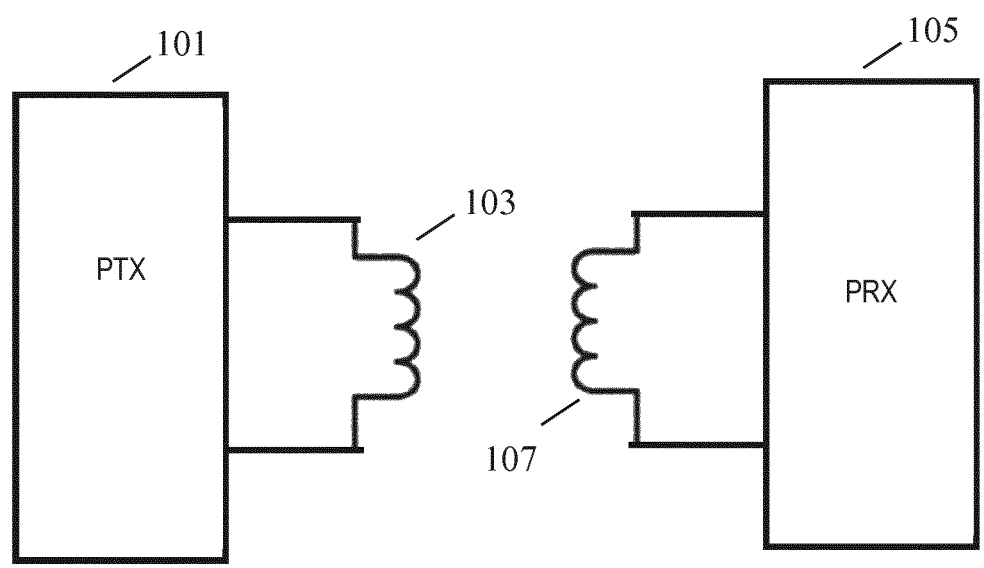
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may correspond to the electromagnetic power transfer component representing the energy transfer from the power transmitter to the power receiver, and may be considered to correspond to the component of the generated electromagnetic field that transfers power from the power transmitter to the power receiver. For example, if there is no loading of the receive coil 107, no power will be extracted by the power receiver from the generated electromagnetic field (apart from losses). In such a scenario, the driving of the transmitter coil 103 may generate an electromagnetic field of potentially high field strength but the power level of the power transfer signal will be zero (apart from losses). In some situations, where a foreign object is present, the power transfer signal may be considered to include a component corresponding to the power transfer to the foreign object, and thus the power transfer signal may be considered to correspond to the power being extracted from the electromagnetic field generated by the power transmitter.

The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the basic power profile), up to 15 W for Qi specification version 1.2, in the range up to 100 W for higher power applications such as power tools, laptops, drones, robots etc., and in excess of 100 W and up to more than 1000 W for very high-power applications, such as e.g. kitchen applications.

In the following, the operation of the power transmitter 101 and the power receiver 105 will be described with specific reference to an embodiment generally in accordance with the Qi Specification (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 (except for the herein described (or consequential) modifications and enhancements).

In the following, the operation of the system of FIG. 1 will be described with specific focus on foreign object detection.

In wireless power transfer systems, the presence of an object (typically a conductive element extracting power from the power transfer signal and not being part of the power transmitter 101 or the power receiver 105, i.e. being an unintended, undesired, and/or interfering element to the power transfer) may be highly disadvantageous during a power transfer. Such an undesired object is in the field known as a foreign object.

A foreign object may not only reduce efficiency by adding a power loss to the operation but may also degrade the power transfer operation itself (e.g. by interfering with the power transfer efficiency or extracting power not directly controlled e.g. by the power transfer loop). In addition, the induction of currents in the foreign object (specifically eddy currents in the metal part of a foreign object) may result in an often highly undesirable heating of the foreign object.

In order to address such scenarios, wireless power transfer systems such as Qi include functionality for foreign object detection. Specifically, the power transmitter comprises functionality seeking to detect whether a foreign object is present. If so, the power transmitter may e.g. terminate the power transfer or reduce the maximum amount of power that can be transferred.

The inventors have realized that conventional foreign object detection operates suboptimally and that this is partly due to variations and uncertainties in the specific operating conditions and scenario in which the foreign object detection is performed, including variations and uncertainties in the power transmitter properties, power receiver properties, test conditions applied etc.

An example of the challenges to foreign object detection tests is the requirement to perform sufficiently accurate measurements in order to achieve a sufficiently reliable foreign object detection. For example, if a measurement for a foreign object detection takes place in the selection phase of a Qi power transfer initialization phase, the signal that the power transmitter provides for this measurement has to be small enough not to wake up the power receiver. However, this typically results in poor signal/noise ratios leading to reduced detection accuracy. Therefore, the detection performance may be sensitive to the specific signal level applied and there will typically be conflicting requirements.

A power receiver exposed to a small electromagnetic signal may show a leakage current that depends on the level of the electromagnetic signal, the coupling between the primary and secondary coil, and the charging state of the capacitor at the output of the rectifier. This leakage current can therefore vary depending on the actual conditions currently experienced and depending on the specific parameters (e.g. properties of capacitor) of the individual power receiver. Since leakage current influences the reflected impedance at the primary coil, the measurement of the quality factor also depends on the actual conditions and this typically prevents optimal detection.

Yet another problem detecting a foreign object based on e.g. reported received power indications at different loads or signal levels can be less reliable than desired due to the relationships between transmitted and received power being different for different loads and signals levels.

The system of FIG. 1 uses an approach for foreign object detection that seeks to reduce uncertainty and sensitivity to variations, and accordingly it seeks to provide improved foreign object detection. The approach may in many embodiments provide improved foreign object detection and specifically may in many embodiments provide a more accurate and/or reliable foreign object detection. The approach may further allow low complexity and low resource requirements. An advantage of the approach is that it may be suitable for inclusion in many existing systems, such as specifically in a Qi wireless power transfer system, and indeed that this may often be achieved with few modifications.

As will be described in more detail in the following, the approach utilizes a time division approach during the power transfer phase wherein operations, such as foreign object detection, and power transfer may e.g. be performed in different time intervals thereby allowing the interference between these (specifically the impact of the power transfer on the foreign object detection) to be reduced substantially.

Specifically, for the wireless power transfer system, the power transfer signal is subject to a repeating time frame which comprises at least one power transfer time interval and one foreign object detection time interval.

The power transmitter is arranged to perform foreign object detection during the foreign object detection time intervals and in order to facilitate this operation, the power receiver is arranged to disconnect a load thereby reducing the loading of the power transfer signal compared to during power transfer intervals for which the load is connected such that it loads the power transfer signal.

In particular, many foreign object detection approaches become more accurate if the power received/extracted by the power receiver is reduced to (close to) zero by disconnecting the load. In this condition, if power is provided by the power transmitter it is likely to mainly be absorbed by a foreign object in proximity of the power transmitter. Such power being extracted in a foreign object can be measured and detected with a much higher accuracy because the power level and uncertainty of the power extracted by the power receiver is reduced substantially and typically will be reduced to e.g. only that extracted by friendly metal of the power receiver. Not only does this increase the relative impact of the foreign object on the power transfer signal but it may also typically enable a more accurate compensation for the power extracted by the power receiver (e.g. the power extracted by friendly metal can be estimated during a calibration process and subsequently compensated for in the foreign object detection algorithm).

The disconnection of the load during the foreign object detection time intervals results in the power level of the power transfer signal being reduced during the foreign object detection time interval relative to the power transfer time interval, and typically the power extracted by the power receiver may be no less than 5, 10, or 50 times lower than the power level during the power transfer time interval.

The power transmitter thus performs the foreign object detection during the foreign object detection time intervals when the loading of the power transfer signal by the power receiver is substantially reduced. Further, the power receiver synchronizes to the repeating time frame on the power transfer signal and uses this to synchronize the disconnection of the load such that this aligns with the foreign object detection time intervals. Typically the load will be disconnected shortly after the determined start of the foreign object detection time interval and reconnected shortly before the end of it thereby providing a small safety margin. As a result of the time frame synchronized operations of the power transmitter and the power receiver, improved foreign object detection is performed while still allowing a high transferred power level.

Figure 2:
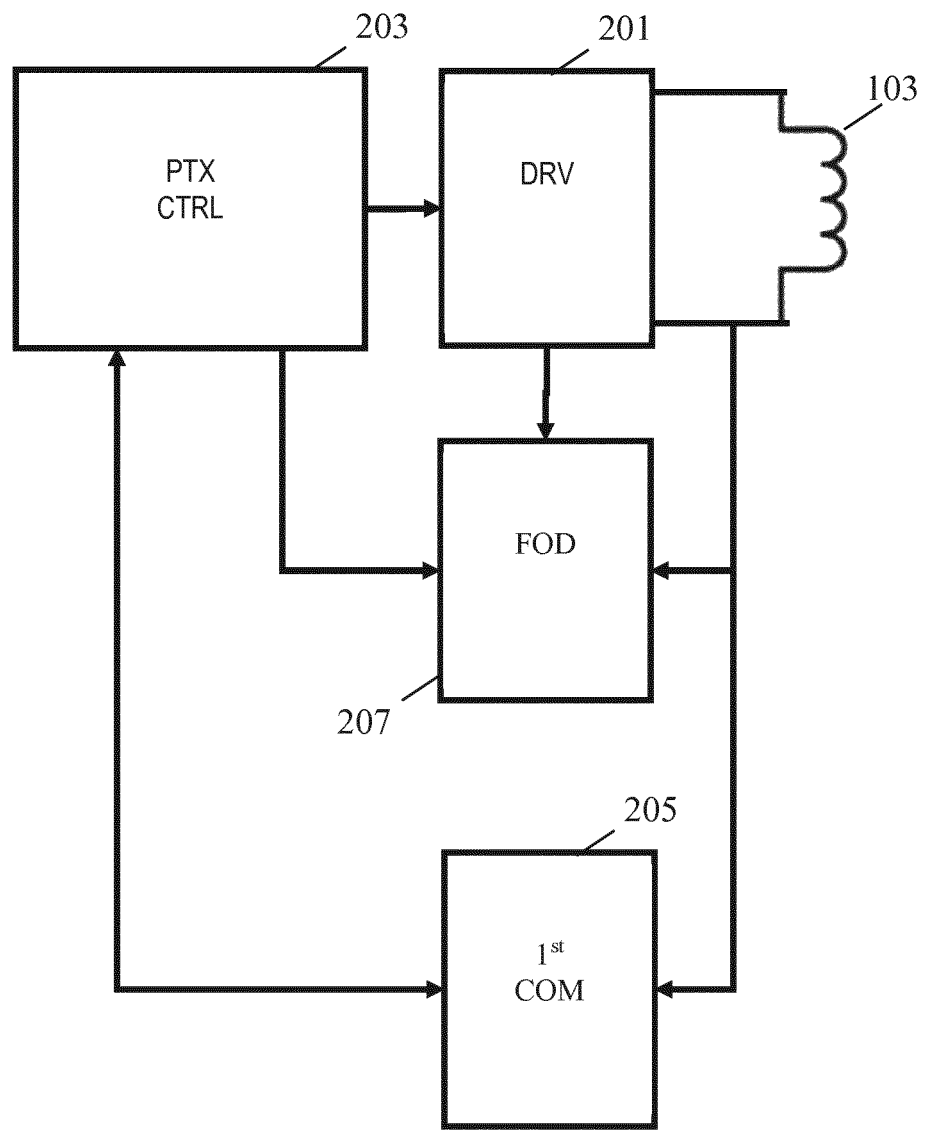
FIG. 2 illustrates an example of elements of a power transmitter in accordance with some embodiments of the invention.
Figure 3:
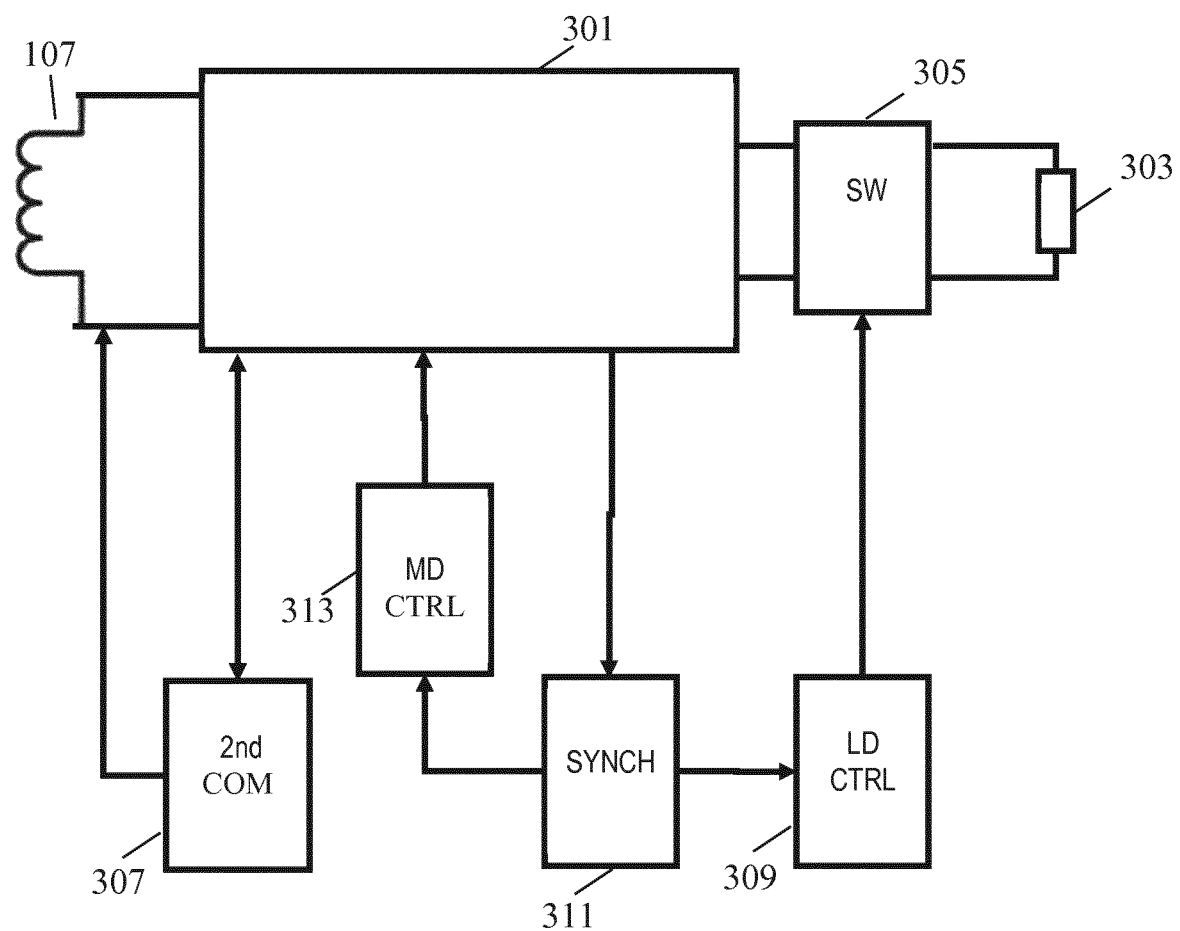
FIG. 3 illustrates an example of elements of a power receiver in accordance with some embodiments of the invention.

FIG. 2 illustrates elements of the power transmitter 101 and FIG. 3 illustrates elements of the power receiver 105 of FIG. 1 in more detail.

The power transmitter 101 includes a driver 201 which can generate a drive signal that is fed to the transmitter coil 103 which in return generates an electromagnetic field and thus the electromagnetic power transfer signal which provides power transfer to the power receiver 105. The power transfer signal is provided (at least) during power transfer time intervals of the power transfer phase.

Figure 4:
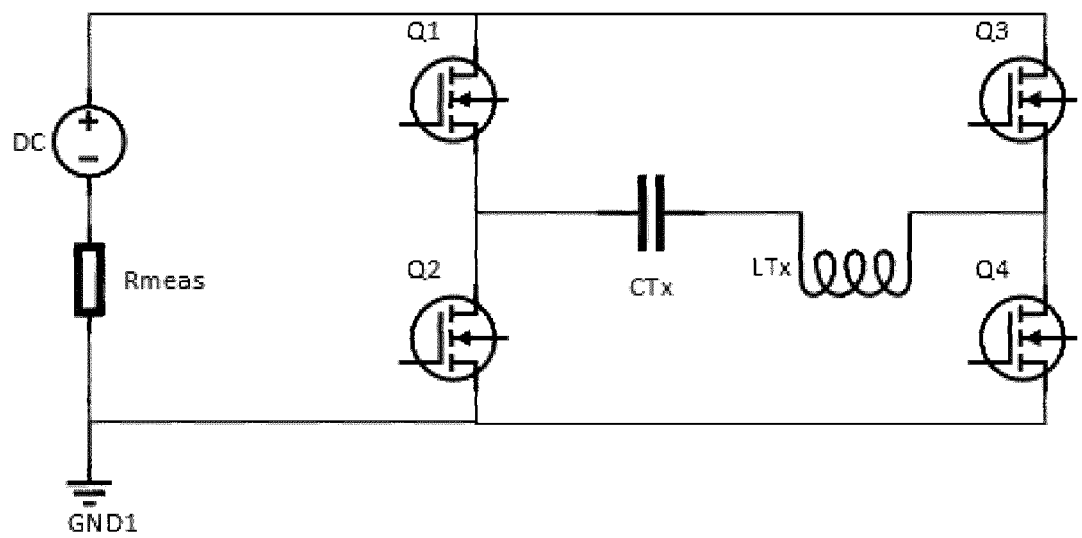
FIG. 4 illustrates an example of elements of an output stage of a power transmitter.

The driver 201 may typically comprise an output circuit in the form of an inverter, typically formed by driving a full or half bridge as will be well known to the skilled person. FIG. 4 illustrates an example of a typical output stage of a power transmitter where an inverter is formed by four FETs coupled in a bridge configuration and with the transmitter coil 103 (LTx) further being coupled to a capacitor (CTx) to form a resonant output circuit.

The power transmitter 101 further comprises a power transmitter controller 203 which is arranged to control the operation of the power transmitter 101 in accordance with the desired operating principles. Specifically, the power transmitter 101 may include many of the functionalities required to perform power control in accordance with the Qi Specifications.

The power transmitter controller 203 is in particular arranged to control the generation of the drive signal by the driver 201, and it can specifically control the power level of the drive signal, and accordingly the level of the generated power transfer signal/electromagnetic field. The power transmitter controller 203 comprises a power loop controller controlling a power level of the power transfer signal in response to power control messages received from the power receiver 105 during the power control phase.

In order to receive data and messages from the power receiver 105, the power transmitter 101 comprises a first communicator 205 which is arranged to receive data and messages from the power receiver 105 (as will be appreciated by the skilled person, a data message may provide one or more bits of information). In the example, the power receiver 105 is arranged to load modulate the power transfer signal generated by the transmitter coil 103, and the first communicator 205 is arranged to sense variations in the voltage and/or current of the transmitter coil 103 and to demodulate the load modulation based on these. The skilled person will be aware of the principles of load modulation, as e.g. used in Qi wireless power transfer systems, and therefore these will not be described in further detail.

In many embodiments, the first communicator 205 is further arranged to transmit data to the power receiver 105 and may specifically be arranged to modulate the power transfer signal using frequency, amplitude, or phase modulation.

In some embodiments, communication may be performed using a separate communication channel which may be achieved using a separate communication coil, or indeed using the transmitter coil 103. For example, in some embodiments Near Field Communication may be implemented or a high frequency carrier (e.g. with a carrier frequency of 13.56 MHz) may be overlaid on the power transfer signal.

In the system of FIGS. 1-3, the communication is during the power transfer phase performed in foreign object detection time intervals. Specifically, some or indeed all of the foreign object detection time intervals may also be used as communication time intervals in which communication between the power transmitter 101 and the power receiver 105 is performed. Specifically, the transmitter controller 203 may synchronize the first communicator 205 such that the communication operation (typically both receiving and transmitting data) is performed in (and typically only in) the foreign object detection time intervals/communication time intervals of the power transfer phase, i.e. in the foreign object detection time intervals that are assigned for communication.

This may substantially improve communication performance.

The power transmitter 101 further comprises a foreign object detector 207 which is arranged to perform foreign object detection tests, i.e. to specifically detect whether any undesired conductive elements are likely to be present within the generated electromagnetic field.

In the system, the foreign object detection tests are based on measurements performed during foreign object detection time intervals, i.e. during foreign object detection time intervals that are assigned to foreign object detection.

As will be described later in more detail, during the foreign object detection time intervals, the power level of the power transfer signal is reduced by the power receiver disconnecting its load and reducing the overall loading of the power transfer signal. The disconnection of the load corresponds to decoupling the load from the power transfer signal (and this the terms disconnecting and decoupling the load from the power transfer signal may be considered synonymous). The load will accordingly be decoupled/disconnected from the power transfer signal, and from the receive coil 107.

In many embodiments, the power receiver 105 may be arranged to minimize the loading of the power transfer signal to only correspond to loading resulting from friendly metal (metal parts of the power receiver itself) and possible a small amount of power used by control functionality of the power receiver. The power receiver may often completely disconnect the target load from the power transfer signal during the foreign object detection time intervals. This may for example often reduce the loading of the power transfer signal from e.g. 5-50 W during the power transfer time intervals to less than 500 mW during the foreign object detection time intervals.

It should be noted that the power level of the power transfer signal may be reduced without this resulting in (or being caused by) a reduction in the generated electromagnetic field strength. For example, the power receiver disconnecting the load will result in a reduced amount of power being extracted from the electromagnetic field and the power transfer signal, and thus from the drive signal to the transmitter coil 103. However, this needs not result in reduction in the generated field strength and indeed may result in a large field strength as the opposing electromagnetic field caused by the current in the receiver coil 107 is reduced.

Thus, in many embodiments, the foreign object detection time intervals are characterized by a reduced power transfer from the power transmitter to the power receiver in comparison to that during the power transfer time intervals (or at least by a reduced maximum possible/available power transfer from the power transmitter to the power receiver in comparison to the maximum possible/available power transfer during the power transfer time intervals). However, the strength of the electromagnetic field generated by the transmitter coil 103 may remain the same or even increase.

Indeed, in many embodiments where the foreign object detection is based on measuring the loading of the electromagnetic field generated by the transmitter coil 103, it may be desirable to adapt the drive signal such that the generated electromagnetic field has a field strength suitable for performing the intended operation during the foreign object detection time interval. This may possibly even be a higher field strength than during the power transfer time interval but the amount of power being transferred is reduced due to the power receiver disconnecting the load. In most implementations, it is however desirable for the field strength to not be too high when the receiver disconnects the load (in order to mitigate against overvoltage conditions).

The reduced loading allows for a much more accurate foreign object detection in many situations. It will result in the power dissipated in a foreign object being a much larger proportion of the total power dissipation, and indeed typically in the foreign object dissipated power exceeded the power dissipated in the power receiver, thereby making the detection of this foreign object power dissipation much easier.

In the approach of FIG. 2, the electromagnetic test signal is generated by the driver 201 driving the transmitter coil and thus the electromagnetic test signal may be considered to correspond to the power transfer signal during the foreign object detection time intervals. However, it will be appreciated that in some embodiments, the electromagnetic test signal may be generated by a different coil than the transmitter coil 103 (e.g. a dedicated test coil). In the following, the term power transfer signal will be used to refer to the electromagnetic field signal generated by the power transmitter during power transfer time intervals and during foreign object detection time intervals.

During an interval in which foreign object detection is performed, i.e. during a foreign object detection time interval, the foreign object detector 207 may evaluate conditions to determine whether a foreign object is considered present or not. During the foreign object detection time interval, the power transmitter 101 generates an electromagnetic test signal and the foreign object detection is based on evaluating characteristics and properties of this signal.

For example, the power level of (the power extracted from) the generated power transfer signal may be used as an indication of the power being extracted by potential foreign objects (typically by comparing it to the expected power extraction from the power receiver 105). The power level of the power transfer signal reflects the power that is extracted from the generated electromagnetic field by conductive elements (including the receiver coil 107) present in the electromagnetic field. It thus indicates the power extracted by the combination of the power receiver 105 as well as any foreign objects that may be present. The difference between the power level of the power transfer signal and the power extracted by the power receiver 105 accordingly reflects the power extracted by any foreign objects present. The foreign object detection may for example be a low complexity detection wherein a detection of a foreign object is considered to have occurred if the difference between the power level of the electromagnetic signal (henceforth referred to as transmit power level) exceeds the reported power extracted by the power receiver 105 (henceforth referred to as received power level).

In the approach, the foreign object detection is accordingly based on a power level comparison between a transmitted power level and a reported received power level. The reaction to a detection of a foreign object may be different in different embodiments. However, in many embodiments, the power transmitter 101 may be arranged to terminate a power transfer (at least temporarily) in response to a detection of a foreign object. In other embodiments, it may be arranged to impose reduced power limits on the power transfer signal during the power transfer time intervals while allowing power transfer to proceed.

FIG. 3 illustrates some exemplary elements of the power receiver 105.

The receiver coil 107 is coupled to a power receiver controller 301 which couples the receiver coil 107 to a load 303 via a switch 305 (i.e. it is a switchable load 305). The power receiver controller 301 includes a power control path which converts the power extracted by the receiver coil 107 into a suitable supply for the load. In addition, the power receiver controller 301 may include various power receiver controller functionality required to perform power transfer, and in particular functions required to perform power transfer in accordance with the Qi specifications.

In order to support communication from the power receiver 105 to the power transmitter 101 the power receiver 105 comprises a second communicator 307.

The second communicator 307 is arranged to transmit data to the power transmitter by varying the loading of the receiver coil 107 in response to data to be transmitted to the power transmitter 101. The load variations are then detected and demodulated by the power transmitter 101 as will be known to the person skilled in the art.

In the example, the second communicator 307 is furthermore arranged to demodulate amplitude, frequency, and/or phase modulation of the power transfer signal in order to retrieve data transmitted from the power transmitter.

The power receiver controller 301 is further arranged to control the second communicator 307 such that the communication during the power transfer phase is performed in the communication intervals, i.e. during time intervals in which the power level of the power transfer signal is reduced.

Thus, similarly to the first communicator synchronizing communication with the power receiver to occur during foreign object detection time intervals, the second communicator also synchronizes communication with the power transmitter to occur during foreign object detection time intervals.

Figure 5:
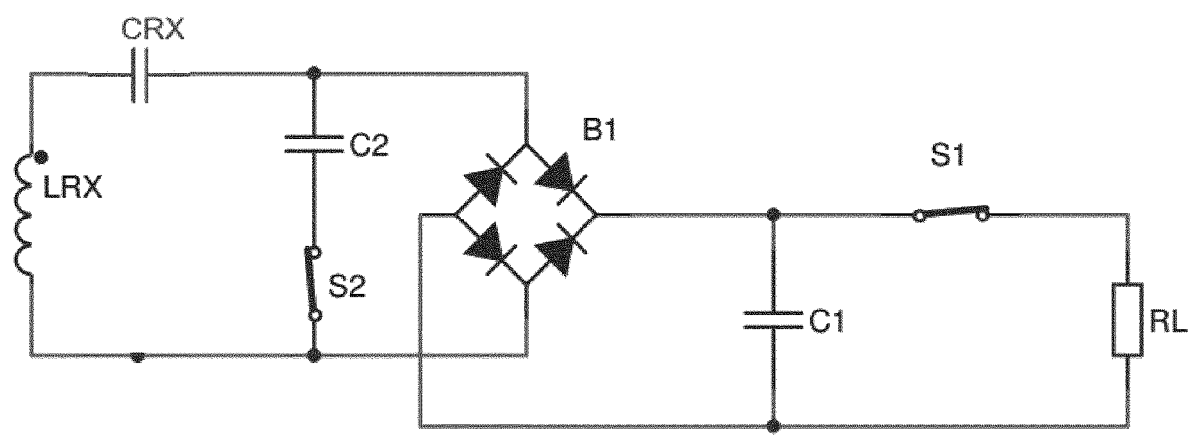
FIG. 5 illustrates an example of elements of a power receiver in accordance with some embodiments of the invention.

FIG. 5 illustrates a circuit diagram of elements of an example of a power path of the power receiver 105. In the example, the power receiver 105 comprises the receiver coil 107 referred to by the designation LRX. In the example, receiver coil 107 is part of a resonance circuit and the power receiver 105 accordingly also includes a resonance capacitor CRX. The receiver coil 107 is subjected to the electromagnetic signal/field and accordingly an AC voltage/current is induced in the coil. The resonance circuit is coupled to a rectifier bridge with a smoothing capacitor C1 coupled to the output of the bridge. Thus, a DC voltage is generated over the capacitor C1. The magnitude of the ripple on the DC voltage will depend on the size of the smoothing capacitor as well as on the load.

The bridge B1 and smoothing capacitor C1 are coupled to the load 303 which is indicated by reference sign RL via the switch 305 which is illustrated by switch S1. The switch 305 can accordingly be used to connect or disconnect the load from the power path and thus the load is a switchable load 305. It will be appreciated that whereas the switch S1 is shown as a conventional switch, it may of course be implemented by any suitable means including typically by a MOSFET. It will also be appreciated that the load 303 is illustrated as a simple passive port but that it may of course be any suitable load. For example, the load 303 may be a battery to be charged, a mobile phone, or another communication or computational device, may be a simple passive load etc. Indeed, the load 303 need not be an external or dedicated internal load but may for example include elements of the power receiver 105 itself Thus, the load 303 illustrated in FIGS. 3 and 5 may be considered to represent any load of the receiver coil 107/the electromagnetic signal that can be disconnected by the switch 305/S1, and it is accordingly also referred to as a switchable load 305.

FIG. 5 further illustrates a load modulation capacitor C2 which can be connected or disconnected in parallel to the resonance circuit based on the switching of switch S2. The second communicator 307 may be arranged to control the switch S2 such that the load of the modulation capacitor C2 can be connected and disconnected in response to data to be transmitted to the power transmitter 101 thereby providing load modulation.

The power receiver 105 is arranged to enter a reduced power mode during the foreign object detection time interval (s) of each time frame during the power transfer phase. In the example, the power receiver 105 comprises a load controller 309 which controls the switch 305 (equivalently the switch 305 can be considered part of the load controller). During a foreign object detection time interval, the load controller 309 can disconnect the load 303 from the power receiver, i.e. it disconnects a load of the power receiver controller 301, and thus a load of the receiver coil 107. Thus, in this way the load controller 309 may reduce the loading of the receiver coil 107 during the foreign object detection time interval. Furthermore, not only is the load of the power receiver 105 reduced thereby making it easier to detect other power loss or to detect modulation but often more importantly the power receiver 105 enters a more well-defined or certain state in which the impact of load variations on the power transfer signal is reduced.

In the example of FIG. 5, the switch Si may be used to disconnect the load during the foreign object detection time interval. It will be appreciated that in embodiments where the switchable load 303 requires a more constant power provision, the switch S1 may be positioned before the capacitor C1 or another energy reservoir may be provided after switch S1 to supply the switchable load 303 with power during the foreign object detection time interval.

It will be appreciated that the loading of the receiver coil 107 may not be completely switched off during the foreign object detection interval. For example, the power receiver 105 may still extract power for e.g. operating some internal circuitry. Thus, the load controller 309 may be arranged to disconnect a load from loading the receiver coil 107 while still allowing the receiver coil 107 to be loaded by one or more other loads. Indeed, the loading of the receiver coil 107 can be considered as being comprised of a load which is disconnected by the load controller 309 during the foreign object detection interval and a load which is not disconnected by the load controller 309. Thus, the load 303 can be considered to represent the load that is disconnected by the receiver coil 107 during the foreign object detection interval. This load may include both an external or internal load for which the power transfer is established but may also include for example internal control functionality temporarily switched off during the foreign object detection interval.

The power receiver controller 301 is arranged to establish a power control loop with the power transmitter 101. Specifically, the power receiver controller 301 can transmit power control messages to the power transmitter 101 and in response the power transmitter 101 may change the power level of the power transfer signal during the power transfer time intervals. Typically, the power receiver controller 301 may generate power control error messages which indicate a request for the power transmitter 101 to increase or decrease the power level. The power receiver controller 301 may determine the appropriate error messages by comparing a measured value to a reference value. During power transfer, the power receiver controller 301 may compare the provided power level with the required power level and request an increased or decreased power level based on this comparison.

Figure 6:
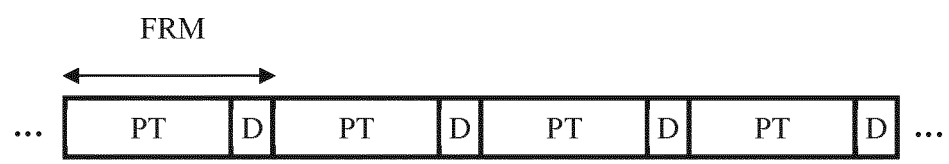
FIG. 6 illustrates an example of a time frame for a wireless power transfer system of FIG. 1.

As previously mentioned, the system applies a repeating time frame during the power transfer phase where the time frame comprises at least one power transfer time interval and one foreign object detection time interval. An example of such a repeating time frame is illustrated in FIG. 6 where power transfer time intervals are indicated by PT and foreign object detection time intervals are indicated by D. In the example, each time frame FRM comprises only one foreign object detection time interval and one power transfer time interval. However, it will be appreciated that in other embodiments, other time intervals may also be included in a time frame or a plurality of foreign object detection time intervals and/or power transfer time intervals may be included in each time frame. Specifically, a repeating time frame may comprise different types of foreign object detection time intervals, such as one or more foreign object detection time intervals and one or more communication time intervals.

In the approach, foreign object detection (and e.g. operations such as communication) may be performed in the foreign object detection time intervals, and thus the foreign object detection (and e.g. communication) and the power transfer may be separated in the time domain thereby resulting in reduced cross-interference from the power transfer to the foreign object detection/communication. Thus, the variability and uncertainty resulting from variations in the operating conditions for the power transfer can be isolated from the foreign object detection (communication) resulting in a more reliable and accurate foreign object detection (communication).

In the power transfer phase, the power transmitter is thus arranged to perform power transfer during the power transfer time interval of the time frames of the power transfer phase. Specifically, during these time intervals, the power transmitter and the power receiver may operate a power control loop (the power control loop may be based on communication within communication time intervals corresponding to repeating time intervals). Thus, the level of the power being transferred may be dynamically varied.

In the foreign object detection time intervals of the time frames of the power transfer phase, the power receiver disconnects/decouples a load resulting in a reduction in the power level transferred to the power receiver by the power transfer signal.

As previously mentioned, the reduction in the power level need not correspond to a reduction of the field strength of the generated electromagnetic field. For example, when the power transfer level is significantly reduced by the loading of the field by the power receiver being reduced, e.g. by disconnecting the load 303, the resulting electromagnetic field strength/the signal level of the generated electromagnetic signal may increase. Indeed, it may typically be desirable to keep the magnetic field strength relatively high in order to measure sufficient power dissipation in a foreign object, and thus in order to facilitate and improve foreign object detection. At the same time, it is typically desirable that the field strength is sufficiently low to not cause unacceptable overvoltage conditions when the load 303 is disconnected.

The power receiver 105 may accordingly reduce a loading by the power receiver of the power transfer signal during a foreign object detection time interval. Specifically, the load of the power transfer signal (functioning as an electromagnetic test signal) by the power receiver during the foreign object detection time interval will be less than the load of the power transfer signal by the power receiver during the power transfer time interval (the load may e.g. be considered the effective resistive impedance of respectively the transmitter coil 103 and the test coil 209 during the power transfer time interval and the foreign object detection time interval respectively).

By reducing the level of power extracted by the power receiver, the presence of any foreign object becomes easier to detect. This may result from the total amount of extracted power being reduced thereby making it easier to detect lower power levels for power extracted by a foreign object. Further, by disconnecting the load, the power receiver may typically be entered into a predetermined (or at least easier to predict) state thereby facilitating compensation for the power receiver when performing the foreign object detection test.

Thus, the disconnection of the switchable load 303 not only reduces the load of the power transfer signal but may also provide for this load to be more predictable and to have reduced variation. Typically, the load of a power transmitter by a power receiver may vary substantially not only from application to application, but also as a function of time for the same application and power transfer session. The power control loop is operated during the power transfer phase to adapt to such variations. However, by introducing a foreign object detection time interval in which the load may be disconnected, it is possible to enter the power receiver into a reference mode in which the loading of the electromagnetic field is more predictable. Thus, e.g. the foreign object detection tests can be performed based on the assumption that the power receiver is in this reference or test mode, and thus e.g. a predetermined loading of the electromagnetic test signal can be assumed. The approach may thus not only allow for the loading by the power receiver 105 to be reduced (thereby improving accuracy by the relative impact of any foreign objects being higher) but also allows this to be more predictable thereby facilitating the compensation for the presence of the power receiver during the foreign object detection test.

Thus, the system of FIGS. 1-5 provides for a much improved foreign object detection test approach where the foreign object detection tests are performed under much more controlled conditions thereby allowing a more accurate and reliable foreign object detection tests to be performed.

A significant issue in such a system is that it is important for the power receiver and the power transmitter to be closely synchronized, and it is specifically important that the power receiver connects and in particularly disconnects the load at the appropriate times. For example, during a typical power transfer operation, the power level of the power transfer signal may be very high during the power transfer time intervals. If the load of the power receiver is disconnected during a time when the power transmitter generates such a strong magnetic field and power transfer signal, an overvoltage may be induced in the power receiver when the load is disconnected. When the load is disconnected, the resonant circuit of the power transmitter, which is coupled via the transmitter coil (103) and the receiver coil (107) of the power receiver, is no longer damped by the load. Indeed, there is a risk that the induced voltage at the power receiver may increase to a level that may cause damage to components of the power receiver when it disconnects the load.

However, the repeating time frame enables the power transmitter to reduce the signal level during the foreign object detection time intervals to a level at which the induced voltage does not harm the components of the power receiver. If the power receiver disconnects its load after an appropriate reduction in the electromagnetic field strength/signal level, the overvoltage condition at disconnection can be avoided. For example, the power receiver may measure e.g. the induced voltage at its receiver coil to detect a reduction of the power signal in order to use this as a trigger for the start of a foreign object detection interval and it may proceed to disconnect its load on this trigger. However, this is often not a very reliable method, because the reduction may have been caused by other conditions than as an indication of the start of a foreign object detection interval. For example, the power transmitter may reduce the power signal due to a control error previously received from the power receiver. Also, a change in the load may lead to a reduction of the induced Voltage at the receive coil. The power receiver therefore needs a reliable method for determining the start of a foreign object detection interval in situations where the power signal is high in the power transfer intervals to prevent overvoltage and damage to its components when disconnecting the load.

At the end of the foreign object detection time interval, the load is reconnected to the receive coil 107 such that it loads the power transfer signal. Again, it is desirable for the load to be connected prior to the power transfer time interval in order to ensure that the increased electromagnetic field does not induce too high a voltage resulting in an overvoltage condition. Again, the power receiver needs a reliable method to re-connect its load in time, namely before the power transmitter increases the signal level.

Thus, it is typically advantageous for the disconnection and the re-connection of the load to occur within the foreign object detection time interval. However, it is desirable for the time available for foreign object detection to be sufficiently large to allow accurate measurement (with sufficient averaging). Furthermore, these conflicting preferences are constrained by the overall desire to make foreign object detection time intervals as short as possible in order to increase efficiency and minimize interruptions in the effective power transfer. Therefore, it is desirable to disconnect the load as shortly after the start of the foreign object detection time interval as possible and to connect the load as close to the end of the foreign object detection time interval as possible. In order to achieve safe disconnection of the load and optimal performance, it is important to reliably and closely synchronize the operation of the power receiver, and in particular the load controller 309, to the repeating time frame.

The timing of the operations of the power receiver is based on a local time reference/time base and the load controller 309 is arranged to time the connection and the disconnection of the load 303 based on the local time reference/base. Further, the power receiver 105 comprises a synchronizer 311 which is arranged to synchronize the local time reference to the repeating time frame. Thus, the power receiver 105 comprises functionality for synchronizing the connecting and disconnecting of the load 303 to the repeating time frame of the power transfer signal.

For example, the local time reference may be implemented using a timer/clock etc. as will be well known to the skilled person. In some embodiments, this timer/clock may be a free running time base and the synchronizer 311 may determine times of this free running time base that corresponds to the different time slots/intervals of the repeating time frame. For example, the synchronizer 311 may determine which time values of the time base correspond to the beginning and end of the foreign object detection time intervals, and the connecting and disconnecting of the load 303 may then be timed to occur at these times (typically with a small offset).

In other embodiments, the synchronizer 311 may be arranged to vary parameters or settings of the time reference such that this aligns with the repeating time frame. For example, a countdown timer may be started when the synchronizer 311 considers a foreign object detection time interval to begin (or just after) and may have a duration determined to correspond to the duration of the foreign object detection time interval as determined by the synchronizer 311 (or slightly shorter). The load controller 309 may then be arranged to disconnect the load 303 when the countdown timer is started and reconnect it when the countdown timer has finished the countdown.

In many embodiments, the synchronizer 311 may be arranged to implement a timing loop with an error signal being generated to reflect differences between the repeating time frame and the timing loop. The timing loop may then be driven by this error signal thereby resulting in a bias towards a minimization of the timing error/difference and thus resulting in the timing loop being synchronized with the repeating time frame. For example, a timing phase locked loop may be implemented to generate a local time clock that is synchronized to the repeating time frame and specifically to the foreign object detection time intervals.

It will be appreciated that the specific approach for synchronizing the local time reference to the repeating time frame may depend on the specific preferences and requirements of the individual embodiment.

For example, in some embodiments, the input to the inverter driving the transmitter coil 103 may generate a drive signal having dynamic variations that may be synchronized with the repeating time frame (for example the inverter may be fed with a periodically varying power supply voltage (e.g. generated by rectification of an AC supply voltage)). This may result in periodic and synchronized variations in the power transfer signal that the synchronizer 311 can detect and synchronize to.

In many power transmitters, however, such periodic variations in the drive signal/power transfer signal are not practical or desirable, e.g. typically a smoothed and regulated DC voltage is used as a supply voltage to the inverter. In such embodiments, the power transmitter may be arranged to vary properties of the power transfer signal/generated electromagnetic field/signal between power transfer intervals and foreign object detection time intervals, and the synchronizer 311 may be arranged to synchronize the local time reference based on these variations.

The synchronizer 311 thus specifically enables the timing of the connection and disconnection of the load 303 to be closely synchronized to the repeating time frame and the foreign object detection time intervals. It may specifically allow the disconnection to occur shortly after the start of a foreign object detection time interval and for the reconnection to occur shortly before the end of a foreign object detection time interval thereby ensuring that the duration of the foreign object detection time interval can be reduced and the overhead and margin of ensuring reliable operation when connecting and disconnecting a load can be minimized.

However, in the power receiver of FIG. 3, the synchronizer 311 does not only perform the synchronization but it also proceeds to generate a synchronization reliability measure. The reliability measure is generated as an indication of the estimated reliability/accuracy of the synchronization. It may specifically be considered to reflect how closely the time reference is synchronized to the repeating time frame and/or the probability that the synchronization is within a given synchronization window. The reliability measure may be generated to provide an estimate of the difference between the synchronized time reference and the repeating time frame. The estimate may be a probabilistic estimate.

It will be appreciated that whereas a number of different approaches will be described for determining a reliability measure, the specific approach will depend on the preferences and requirements of the individual embodiment, and that many more or less accurate approaches can be used by the skilled person.

The power receiver 105 further comprises a mode controller 313 which is fed the determined reliability measure for the synchronization. The mode controller 313 is arranged to switch the power receiver 105 between different operational modes, and specifically is arranged to switch the power receiver between a first operational mode and a second operational mode for the power transfer time intervals in response to the reliability measure. Thus, the power receiver 105 is arranged to operate differently during the power transfer time intervals depending on the reliability of the synchronization of the power receiver 105, and specifically on the synchronization of the disconnection of the load, to the repeating time frame.

In many embodiments, the level of the power transfer signal during the power transfer time intervals is reduced when in the first mode relative to when in the second mode of operation.

The synchronization performance is accordingly taken into account for the operation of the power receiver, and indeed the operation is adapted during the power transfer time intervals dependent on the reliability of the synchronization of the disconnection (and typically the reconnection) of the load—even if these actions occur during the foreign object detection time intervals.

The first and second operational modes may specifically employ different power transfer parameters for the power transfer operation. For example, the power levels requested, and/or the loading and power extracted from the power transfer signal may be different in the first and second operational modes. The first and second operational modes may employ different power transfer parameters by at least one of: applying a different limit for a signal level of the power transfer signal in the first and second operational modes; employing a different load of the power transfer signal in the first and second operational modes; applying a different limit to rate of changes for power levels of the power transfer signal in the first and second operational modes. These examples will be described in more detail later.

The mode controller 313 may specifically be arranged to switch the power receiver 105 from the first mode (of operation) to the second mode (of operation) in response to a detection that the reliability measure increases above a given threshold. Similarly, the mode controller 313 may be arranged to switch the power receiver 105 from the second mode (of operation) to the first mode (of operation) in response to a detection that the reliability measure falls below a given threshold (the two thresholds may be the same but are not necessarily so). Thus, the power receiver 105 may operate in different modes during the power transfer time intervals depending on whether the synchronization is reliable or not.

This may provide a more reliable and more safe operation in many embodiments.

For example, in some embodiments, the power receiver 105 and specifically the load controller 309 are arranged to disconnect the load 303 during the power transfer time intervals when in the first mode but not when in the second mode. Indeed, in this example, the load 303 may in some embodiments be disconnected during the entire repeating time frame when in the first mode whereas periodic disconnection of the load 303 during the foreign object detection time intervals is employed when operating in the second mode. Accordingly, when the reliability measure indicates that the synchronization is not reliable, the load 303 may be disconnected during both power transfer time intervals and foreign object detection time intervals, and typically for the whole duration of the repeating time frame whereas when the reliability measure indicates that the synchronization is reliable, the load 303 is only disconnected temporarily during the foreign object detection time intervals.

In addition, in order to prevent an unacceptably high induced voltage at the power receiver, the power receiver may ensure that the signal level provided by the power transmitter is sufficiently low. The power receiver can control the level of the power signal provided by the power transmitter by sending control errors. Specifically, if the synchronization is considered to not be reliable, the power receiver may control the power transmitter to reduce the power level/signal strength.

In this approach, the first mode ensures that there are no disconnection switchings of the load during times at which the induced signal may potentially have a large value. Thus, errors or inaccuracies in the synchronization will not result in overvoltage conditions occurring by disconnections during the power transfer time intervals. However, when the synchronization is sufficiently accurate to ensure that the disconnections occur within foreign object detection time intervals, the system moves to an operational mode wherein the power transfer is performed (the signal level provided by the power transmitter may be controlled to a high level by the power receiver) and the load connected during the foreign object detection time intervals. This shift between different operational modes may allow the design parameters and criteria for the foreign object detection time intervals and the load disconnection to be much more reliable in the second mode of operation, while also allowing much tighter and with less margin. This prevents an overvoltage condition that may cause damage to the electrical components of the power receiver and may reduce the time required for foreign object detection time intervals to be reduced as less margin is required from the start of a foreign object detection time interval to the load disconnection.

Such an approach may in some embodiments be applied throughout the power transfer phase and e.g. the power receiver may continuously monitor the status of the synchronization and switch to the first mode if the reliability measure becomes indicative of the synchronization not being sufficiently reliable, and then switch back to normal operation when the reliability measure indicates that the synchronization is again reliable.

This may be suitable for some applications, such as non-critical battery charging but may be unsuitable for other applications wherein a guaranteed continuous power transfer performance is required. In such scenarios, the power receiver may e.g. be arranged to terminate the power transfer operation completely if the synchronization becomes unreliable. Further, in such embodiments, the parameters may be determined to ensure that such a situation occurs only very rarely.

In many embodiments, the system may be arranged to adopt a synchronization phase initially when entering the power transfer phase. Thus, the power transfer phase may start with a synchronization interval in which synchronization of the power receiver to the reduced power time interval of the power transfer signal is performed. In such embodiments, the power receiver may enter the power transfer phase and the synchronization phase/time interval in the first mode of operation and only switch to the second mode when the reliability measure indicates that the synchronization is sufficiently reliable. Such an approach will typically be advantageous even for more critical applications requiring a continuous power transfer.

Thus, in many embodiments, the mode controller 313 controls the power receiver 105 to operate in the first operational mode when it enters the power transfer phase. Further, when entering the power transfer phase, the synchronizer 311 performs synchronization of the local time reference to the repeating time frame. Thus, the system may start the power transfer phase in a state and mode wherein the power receiver 105 is not (guaranteed to be sufficiently) synchronized to the repeating time frame. However, this is compensated by the power receiver 105 operating in the first mode which may be designed to provide appropriate performance for the situation when the power receiver 105 is not synchronized to the power transmitter 101/the repeating time frame. In the specific example, this is achieved by keeping the load 303 permanently disconnected throughout the repeating time frame thereby ensuring that overvoltage conditions caused by the disconnection of the load 303 cannot occur.

Additionally, the signal level provided by the power transmitter under control of the power receiver is typically reduced in the first mode in order to ensure that no overvoltage occurs while the load is permanently disconnected.

Typically, the operation is such that generated signal level and load reductions o hand-in-hand:

1. A high signal level and disconnected load can lead to an overvoltage and even potential damage of the power receiver 2. A low signal level and connected load can lead to an undervoltage and can stop the power receiver working.

Accordingly, the power receiver may modify the operation of both the connection/disconnection of loads and the signal level setting based on which mode the power receiver is operating in.

In the specific example, a safe initial phase is entered in which the synchronization may be performed (or a more accurate synchronization may be achieved) and during which the power receiver is arranged to operate in a "safe" mode where synchronization errors do not result in potentially damaging conditions arising. The power receiver in the specific example disconnects the load 303 for the entire synchronization phase and further controls the power transmitter to generate an electromagnetic field with a signal level that is sufficiently low.

The mode controller 313 maintains the power receiver 105 in this first (safe) mode until the reliability measure indicates that the synchronization is sufficiently accurate at which time it switches the mode controller 313 to the second mode of operation in which "normal" power transfer proceeds, and specifically in which the load 303 is connected during the power transfer time intervals. Thus, the power receiver 105 remains in the "safe" synchronization mode until the reliability measure indicates that sufficiently accurate and reliable synchronization has been achieved.

It will be appreciated that whereas in the example above the load 303 is disconnected completely during the synchronization phase, this is not necessarily the case in other embodiments. For example, in some embodiments, only part of the load 303 may be disconnected during the synchronization phase, i.e. the power receiver 105 may be arranged to couple a lighter load to the receive coil 107 during the synchronization phase than during normal power transfer. For example, the load may be reduced to a level wherein the overvoltage condition is acceptable.

Different approaches and algorithms may be used to synchronize the local time reference to the repeating time frame in different embodiments. In many embodiments, the power transmitter 101 may be arranged to vary the level of the generated electromagnetic field such that the variations are synchronized to the repeating time frame. The synchronizer 311 may then monitor the level variations and synchronize the time reference to this.

As an example, the power transmitter 101 may be arranged to insert a short, predetermined pattern or signature of level variations at the start of each repeating time frame and the synchronizer 311 may be arranged to detect this pattern/signature and determine the start time of the repeating time frame from the timing of the detected pattern/signature.

In many embodiments, the power transmitter 101 may be arranged to generate the electromagnetic signal such that the signal level is different in the power transfer time intervals and the foreign object detection time intervals and the synchronizer 311 may be arranged to synchronize the local time reference to the resulting signal level variations. Specifically, the synchronizer 311 may detect the timing of the level transitions of the power transfer signal (specifically the signal induced in the power receiver coil) and adjust or compensate the local time reference such that the locally generated repeating time frame timing corresponds to these transitions. For example, in some embodiments, the time difference between the detected signal level transitions and the expected transition between a foreign object detection time interval and a power transfer time interval according to the local time reference may be used as an error signal for a phased locked timing loop controlling the local time reference.

In some embodiments, the power transmitter may be arranged to introduce or ensure such transitions autonomously. However, in other embodiments, the power receiver may be arranged to communicate with the power transmitter in order to ensure such signal level variations.

For example, the power receiver controller 301 may be arranged to transmit signal level requests for the power transfer signal to the power transmitter during the synchronization phase, and thus while the power receiver is operating in the first mode. These signal level requests may be selected such that the signal level of the power transfer signal during the power transfer intervals differ from a signal level of the power transfer signal during the foreign object detection intervals. It may further control the power transmitter to generate a signal level which is sufficiently low to not generate unacceptable overvoltage conditions.

Specifically, the power transmitter 101 may be arranged to provide a given signal level during the foreign object detection time intervals, such as e.g. a predetermined level or a level determined previously in communication with the power receiver (as will be described later). Thus, the power transmitter may be arranged to set the signal level for the drive signal, and thus for the generated electromagnetic field, to this static value during the foreign object detection time intervals of the frames. However, the system may operate a power control loop to dynamically adjust the levels of the power transfer time intervals. This power control loop may be active throughout the power transfer phase and be used to adapt the power transfer signal to provide the required power level. However, during the synchronization phase, the power control loop may be used by the power receiver to adapt the signal level of the power transfer time intervals to be different from that during the foreign object detection time intervals.

For example, the power receiver may transmit power up requests until the synchronizer 311 accurately detects signal level transitions (and e.g. until these transitions have a given magnitude). The power receiver may then continue to transmit power up and power down requests to maintain the level during the power transfer time intervals at this preferred level.

During the synchronization phase, the power control loop may accordingly be used by the power receiver to generate suitable conditions for the synchronization. A particular advantage of such an approach is that it may use functionality already used for the actual power transfer operation. For example, the power transmitter may simply enter the power transfer phase setting a predetermined signal level for the power transfer signal during the foreign object detection time intervals and operating the power control loop for setting the level during the power transfer time intervals. This approach may be continued throughout the power transfer phase regardless of whether the power receiver is in the synchronization phase or not, and thus whether the power receiver is operating in the first or the second mode. Indeed, the power transmitter may not be aware that the power receiver performs a synchronization operation or that this is even possible. Thus, the approach may provide a simpler power transmitter operation and improved backwards compatibility as no specific changes are required at the power transmitter to support the synchronization phase.

In many embodiments, the system is arranged to determine parameters for the repeating time frame by a negotiation/communication between the power receiver and the power transmitter. This may be performed prior to the start of the power transfer phase, and thus prior to the power transfer phase, a set of parameters to use during the power transfer phase may be determined.

The set of parameters (which in some cases may include only a single parameter) determined by the communication prior to entering the power transfer phase may include one or more of a duration of the foreign object time intervals; an interval between foreign object time intervals; and a signal level for the foreign object detection intervals.

Thus, the power transmitter and the power receiver may employ a preparation phase or time interval prior to the power transfer phase in which they communicate with each other in order to determine one or more parameters for the subsequent power transfer phase operation. The operation in the power transfer phase may then be based on the parameters determined during this preparation phase.

For example, in many embodiments, the power receiver may transmit one or more messages to the power transmitter requesting a parameter value to be applied during the power transfer phase. For example, it may request a specific signal level of the generate electromagnetic signal or a specific timing property of the foreign object detection time intervals. The power transmitter and power receiver may then proceed to apply these parameter values and specifically these timing settings for the consequent operation.

In many embodiments, the power transmitter and power receiver may in particular be arranged to communicate in order to establish a duration of the foreign object detection time intervals and/or the duration between foreign object detection time intervals, and typically the duration between consecutive foreign object detection time intervals.

The approach may provide improved trade-offs and may in particular allow the operation to be adapted to the specific properties of the individual devices, and in many embodiments to the specific characteristics of the individual power transfer operation. For example, the timing may be adapted to reflect the power level of the power transfer.

The approach may address that the duration of the foreign object detection time interval may affect the behavior of not only the power transmitter and the power receiver but also potentially of the end load, such as e.g. a device that is powered from the power receiver.

Often, if the foreign object detection time interval is too long, the device may suffer from a decreased effective supply voltage. This is especially relevant when the energy storage of the device is limited, such as for example where a capacitor at the input of the device (output of the power receiver) is smaller than desired. The device must be able to bridge the time during which the power transfer is interrupted, and this typically requires a capacitor that is relatively large (it will be noted that in many embodiments, the power receiver may itself comprise such a capacitor as well as potentially voltage regulation to provide a constant output voltage. However, this just means that the described issue will be relevant for the power receiver rather than the external load device).

If the time slot is too short, the power transmitter may not be able to perform the specific operation acceptably. For example, the power transmitter may not be able to perform a FOD-measurement with sufficient accuracy, e.g. because the measurement signal has not been stabilized when the measurements are executed, or because an insufficient number samples can be taken. As another example, a foreign object detection time interval which is too short may not provide a sufficient communication bandwidth, e.g. it may not be possible to communicate enough data to support power control reporting and the provision of other measurement results.

The optimal duration of the foreign object detection time interval may accordingly depend on a number of characteristics and properties, such as the specific operating parameters and implementation of the power receiver. In some embodiments, the power receiver may accordingly transmit a message to the power transmitter and the power transmitter may be arranged to adapt the timing of the foreign object detection time interval in response to this message.

The message may specifically explicitly be a request for a given duration of the foreign object detection time interval. In many embodiments, the power receiver may evaluate the operating conditions, such as the power being drawn by the external load and may calculate a maximum time during which the energy reservoir/capacitor is able to maintain sufficient charge to prevent the supply voltage to the load to drop too much. For example, the maximum duration may be twice as high for a load of 1A compared to a load of 2A. The power receiver may thus transmit a request for a duration which is twice as high for 2A than it is for 1A load.

As another example, suitable values for the duration of the foreign object detection time interval may be predetermined for the power receiver, for example during the manufacturing phase. For example, the power receiver may be a battery charger with a maximum charge current. The corresponding time duration for which the built in capacitor can retain sufficient charge to provide the maximum charge current can be determined during the design phase and stored permanently in the power receiver during the manufacturing phase. When initiating power transfer with a power transmitter, the power receiver can retrieve this value and transmit a request for the foreign object detection time interval duration to the power transmitter. The power transfer phase can then proceed using a repeating time frame with foreign object detection time intervals in accordance with the stored value. As power receivers may vary very substantially in the requirements and functions, this may allow the power transmitter and the power transfer operation to adapt to the individual characteristics of the power receiver.

In some embodiments, the system may be arranged to set a duration between foreign object detection time intervals based on a message transmitted from the power receiver to the power transmitter. The system may specifically set the duration between foreign object detection time intervals of consecutive repeating time frames and may effectively adapt the duration of the foreign object detection time interval in response to messaging from the power receiver to the power transmitter.

In order to provide sufficient average power transfer, the peak power level of the power transfer during the power transfer time intervals increases the shorter the duration of these are. In many embodiments, the power transfer level may be limited (by the power transmitter or possibly by the power receiver which may only be designed to extract a given maximum amount of power). In such cases, the power receiver may transmit a request for a duration between foreign object detection time intervals which is sufficient to ensure that the capacitor will be fully charged before the onset of the next repeating time interval (this is particularly appropriate for embodiments in which the power transmitter switches off the power transfer signal during the foreign object detection time intervals).

In some embodiments, a single request may be transmitted relating to both the duration of the foreign object detection time interval and the duration between these. For example, in some embodiments, the repeating time frame may have a constant duration and the power receiver may request a specific duty cycle to be applied.

In many embodiments, the power transmitter is arranged to impose a minimum duration requirement on the duration of the foreign object detection time interval. This minimum duration may be used to ensure that the operation that is to be performed in the foreign object detection time interval actually has sufficient time to achieve the desired result. For example, it may ensure that the foreign object detection can be performed with sufficient reliability (including sufficient time for setting up and stabilizing the measurement signal). As another example, the power transmitter may be arranged to require a minimum duration in order for the communication to have sufficient bandwidth.

In many embodiments, the power transmitter is arranged to impose a maximum duration requirement on the duration between foreign object detection time intervals. This maximum duration may be used to ensure that the operation that is to be performed in the foreign object detection time interval is performed sufficiently frequently. For example, it may ensure that the foreign object detection is performed with sufficiently high frequency to ensure that the emergence of a foreign object will be detected before this can be heated to unacceptable levels. As another example, it may ensure that communication is performed sufficiently frequently (e.g. enabling a sufficient update rate for the power control loop).

As yet another example, in some embodiments, the measurements for foreign object detection may be spread over multiple reduced power intervals to improve the accuracy and/or to add some redundancy. This enables more precision for foreign object detection. If the duration of a reduced power time is short, and thus only allows for a small number of samples/measurements, the duration between foreign object detection time intervals may be short in order to compensate and enable a sufficient amount of samples/measurements to be acquired within a given required time that ensures that a foreign object is detected before it heats up too much.

Similarly, the power receiver may be arranged to impose restrictions on the timing values. For example, the power receiver may determine a desired value for the duration of the foreign object detection time interval subject to a maximum value that ensures that sufficient power can be provided to an external load without the discharging of the energy reservoir (typically a capacitor) resulting in unacceptable voltage drops.

Similarly, the power receiver may, as mentioned above, determine a desired value for the duration between foreign object detection time intervals subject to a minimum value that ensures that the power receiver capacitor can be fully recharged.

In many embodiments, the timing properties of the repeating time interval will be subject to requirements imposed by both the power receiver and the power transmitter. Typically, both the power transmitter and the power receiver will have requirements that must simultaneously be met in order for the timing value to be adopted. For example, the setting of the duration of the repeating time interval and/or the duration between consecutive repeating time intervals is subject to the values meeting requirements of both the power transmitter and the power receiver.

Further, in many embodiments, this may typically be one of the devices (i.e. the power receiver or the power transmitter) imposing a restriction on the maximum value, and the other device imposing a restriction on the minimum value of the timing property being set.

Specifically, as explained previously, in many embodiments, the duration of the foreign object detection time interval may be subject to a minimum duration imposed by the power transmitter and a maximum duration imposed by the power receiver.

Similarly, in many embodiments, the duration between foreign object detection time intervals may be subject to a maximum duration imposed by the power transmitter and a minimum duration imposed by the power receiver.

Such implementations may impose efficient control of the suitable timings for the foreign object detection time intervals in many embodiments and may allow for reduced complexity and easier interworking with both devices independently ensuring that the foreign object detection time intervals will have timing properties that allow acceptable performance for both devices, and thus for the overall power transfer.

The exact approach and message exchange used to set the timing properties of the foreign object detection time intervals depends on the preferences and requirements of the individual embodiment, and different approaches may be used in different systems.

However, in many systems, such as typically for Qi type implementations, the approach is based on the power receiver transmitting requests for suitable timing values and the power transmitter accepting or rejecting the rejected values.

Similarly, the power receiver may request a given signal level to be applied during the foreign object detection time intervals by sending an indication during the preparation phase. This request may be based on measurements indicating the impact that the friendly metal of the power receiver will have on the generated signal, on any minimum power required to be provided to the power receiver during the foreign object detection time intervals, to prevent an overvoltage, etc. The request will typically be based on estimations of a nominal power transmitter and operating conditions and therefore will tend to reflect a worst case scenario. However, it may in many embodiments be used to provide an initial setting which can then be refined during the power transfer phase in response to actual measurements of the operating conditions.

An advantage of the approach is that the impact of the friendly metal of the power receiver on a predetermined electromagnetic field can be determined e.g. during the manufacturing or design phase. The power receiver can then report this value to the power transmitter which may compensate for the effect of the power receiver when performing the foreign object detection. This compensation may be very accurate if the power receiver is subjected to a corresponding electromagnetic field strength during the foreign object detection test.

Figure 7:
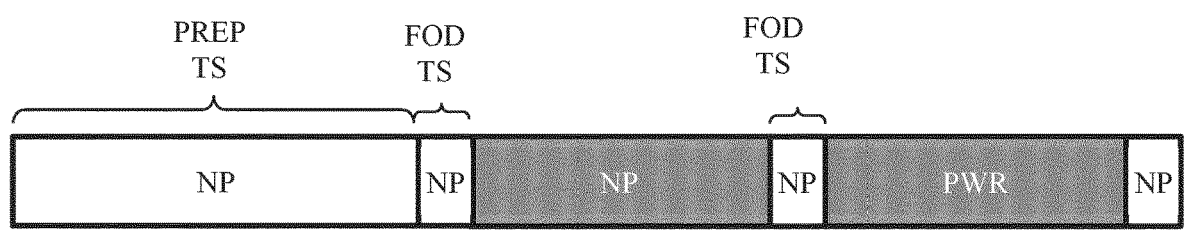
FIG. 7 illustrates an example of a time frame for a wireless power transfer system in accordance with some embodiments of the invention.

FIG. 7 illustrates a (simplified) example of how the system may operate.

Initially, prior to the power transfer phase, a preparation time slot, PREP TS, is implemented. During this preparation time slot, the power receiver disconnects the load 303.

This means that no (or a very little) power is delivered to the load and thus extracted from the signal generated by the power transmitter. The power transmitter may control the drive signal to the transmitter coil 103 to establish a situation at which following conditions preferably apply:

The influence of the friendly metal of the power receiver device on the magnetic field is known by the power receiver or can be accurately determined by the power receiver. E.g. the power dissipation in the friendly metal for a given amplitude and frequency of the magnetic field is known by the power receiver.

The power transmitter can accurately measure the combined influence of the friendly metal and a foreign object if present. E.g. the transmitted power can be accurately determined by the power transmitter.

As a result, the system can accurately determine the influence of a foreign object on the magnetic field. This influence preferably is related to the expected increase of temperature caused by the power dissipation in the foreign object caused by its exposure to the magnetic field of the transmitter coil 103 when the power transmitter is providing power to the power receiver.

To establish the above situation, the power receiver can provide information on an appropriate magnetic field, e.g. by communicating its type, the allowed frequency range and optionally the required amplitude of the AC signal for the transmitter coil 103. The latter of course depends on the design of the transmitter coil 103. In addition, the power receiver could have a measurement coil of which the induced voltage gives a good indication of the field to which the friendly metal of the device is exposed. In that case the power receiver could provide control information to the power transmitter to control the field to a level at which the influence of the friendly metal can be accurately determined by the power receiver.

Once the above situation has been established, the power transmitter can store the setting of the drive signal, and the expected influence of the friendly metal as determined by the power receiver.

In addition, communication may be performed to determine suitable timing parameters for the repeating time frame, such as the duration of the repeating time frame and of the foreign object detection time intervals.

At the end of the preparation phase, a set of timing parameters and a foreign object detection signal level may have been set. Specifically, the preparation phase may have determined measurement signal conditions for the foreign object detection time intervals, the duration of the foreign object detection time intervals, and the time between the foreign object detection time intervals.

The power transmitter will then use these values during the power transfer phase. However, some variation/uncertainty will typically be present, e.g. with respect to the exact timing of transitions between the power transfer time interval and the foreign object detection time intervals.

The system may then enter the power transfer phase in which the repeating time frame is applied. In the example of FIG. 7, the repeating time frame starts with a foreign object detection time interval followed by a power transfer time interval. The system starts in the synchronization phase in which the load 303 is disconnected during the entire repeating time frame including both the foreign object detection time interval and the power transfer time interval. This is in FIG. 7 indicated by the term NP (No Power).

The system further performs synchronization and when the reliability measure indicates that this has been achieved to a desired reliability/level while keeping the power signal at a level at which no overvoltage occurs at the power receiver, the system switches to the second mode of operation corresponding to normal power transfer operation. In this mode, the load 303 is still disconnected during the foreign object detection time intervals but is connected during the power transfer time intervals. This is indicated by the term "PWR" (Power) in FIG. 7. For simplicity and brevity, FIG. 7 illustrates the synchronization phase to only comprise a single repeating time frame but it will be appreciated that it typically includes plurality of repeating time frames (in many applications the synchronization phase may include no less than 10 or 20 repeating time frames (depending on when synchronization is deemed to have been reached)).

As an example of the specific operation during the foreign object detection time intervals includes the power receiver having the load 303 disconnected as previously discussed. This means that no (or very little) power is delivered to the load/power receiver. The power transmitter applies the stored setting of the drive signal and measures the combined influence of the friendly metal and any foreign object present. It compares this influence with the stored expected influence of the friendly metal to determine the impact of the foreign object. It may then determine the maximum amplitude of the drive signal/power transfer signal in relation to the frequency at which it regards the situation to be safe, meaning at which it expects the temperature rise of a foreign object to be within safe limits. The power transmitter will then limit the power transfer signal to this maximum level and report a warning if the power receiver tries to control the power transfer signal to a level above this maximum. Thus, in this example, the power transfer phase is not terminated in the presence of a foreign object but rather the maximum power transfer signal level is reduced to a level ensuring that the temperature increase in the foreign object is restricted to acceptable levels.

If the power transmitter detects a change in the combined impact of the friendly metal and the foreign object, it may return to the preparation phase to re-establish the conditions for the foreign object detection measurement. To prevent early triggers for returning to the preparation time-slot, the power transmitter can combine the results of multiple FOD time slots (e.g. apply an averaging window) and/or adjust the drive signal within certain margins.

In many embodiments, the synchronizer 311 is arranged to perform the synchronization based on the set of parameters determined during the preparation phase. For example, the determined parameters may be used as starting parameters for the synchronization and thus the initial values of the timing parameters may be set to correspond to those determined in the preparation phase. For example, the first estimate of the time transitions from the foreign object detection time interval to the power transfer time interval (and vice versa) may be determined from the agreed duration of the foreign object detection time intervals and the duration between these (the duration of a repeating time frame). These parameters may then be used as the initial parameters for the synchronization, e.g. they may be used as the initial parameters for a phase locked timing loop with the initial error values then being determined to reflect the difference between the measured level transition times and the predetermined values.

In other embodiments, the values determined during the preparation phase may impose restrictions on the synchronization. For example, the synchronizer 311 may fixedly set the duration of the foreign object detection time intervals and the duration between the foreign object detection time intervals to the values determined during the preparation phase. The synchronizer 311 may then adapt the timing offset, i.e. the time instant for the transitions, to achieve the best results (smallest error) under these conditions.

It will be appreciated that different approaches may be used for determining the reliability measure. In many embodiments, the reliability measure may be determined based on an error signal indicating the difference between the current values and the measured values. For example, the (averaged/low pass filtered) error signal of a phase locked timing loop may provide a good indication of the accuracy and reliability of the synchronization. In other embodiments, the reliability measure may alternatively or additionally be determined in dependence on the variance of the timing values. For example, the synchronization may initially be relatively unreliable and therefor the changes in e.g. the timing of the beginning of a foreign object detection time interval may vary substantially. However, as the synchronization becomes more accurate, the variation may settle on the correct value and the changes and variations may be reduced.

In some embodiments, the determination of the reliability measure may take into account how long the power receiver has operated in the first mode. In some embodiments, it may be considered that the synchronization is initially reliable but that it will improve with time. In some embodiments, the reliability measure may be generated to be indicative of a lower reliability for shorter durations than for longer durations. As a low complexity example, the reliability measure may be set to indicate unreliable synchronization until the synchronization operation has been active for a given time. This time will typically depend on the dynamic properties of the synchronization, such as on the dynamic timing loop properties (e.g. the adaption rate). After this time, the reliability measure may be set to a value that depends on the size of the error signal. Such an approach may prevent a reliability measure indicating a high reliability due to a coincidental initial low error signal before the loop has properly adapted to the timing to result in a switch to the second mode of operation. This may prevent the power receiver shifting to the second mode before synchronization has properly been achieved.

In some embodiments, the reliability measure may be determined in response to the parameters determined during the preparation phase. For example, the synchronizer 311 may be arranged to freely synchronize to the repeating time frame based on e.g. detections of level transitions. The resulting timing properties, specifically the resulting duration of the foreign object detection time intervals and the interval between these, may then be compared to the values determined during the preparation phase. The reliability measure may be generated to reflect how closely the synchronization values match the values of the predetermined phase (which in this case may be considered to correspond to the values known to be applied by the power transmitter).

In some embodiments, the synchronizer 311 may be arranged to determine the reliability measure for the synchronization based on a comparison of signal levels for the power transfer signal during power transfer time intervals and foreign object time intervals, respectively. Such an approach may in particular be suitable for determining a reliability measure during the power transfer phase after any potential synchronization phase, during "normal" power transfer operation.

In many embodiments, the synchronizer 311 may continuously synchronize to the repeating time frame of the power transfer signal during the power transfer phase in order to track variations (either in the timing of the power transmitter or of the local time reference) throughout a potentially very long power transfer operation. As previously described, such a synchronization may be based on detecting power level transitions at the transitions between the time intervals. However, the power receiver may dynamically adapt the power level of the power transfer signal to match the load conditions and accordingly it is possible that the required power transfer signal level during the power transfer time intervals becomes close to the predetermined level used during the power transfer time intervals. In such a case, the synchronizer 311 may not be able to accurately detect the transitions and may therefore fail the synchronization. Thus, in some examples, the synchronizer 311 may set the reliability measure to a low level indicating poor synchronization if it is not able to detect sufficiently large signal level steps.

The previous examples focused on the switch from the first mode to the second mode when detecting that the reliability measure indicates that the synchronization is sufficiently reliable. However, alternatively or additionally, the mode controller 313 may be arranged to switch the power receiver from the second mode to the first mode based on the reliability measure. Specifically, if the reliability measure falls below a threshold during the power transfer phase and when in the second mode, thereby indicating that the synchronization is no longer reliable, the mode controller 313 may switch the power receiver back to the first mode of operation. Thus, as a specific example, if the synchronization reliability becomes low during the "normal" power transfer operation, the mode controller 313 may switch the power receiver into the first mode where the power load is also disconnected during the power transfer time intervals thereby ensuring that damaging overvoltage conditions cannot occur. The power receiver may further initiate a dedicated synchronization process and e.g. communicate with the power transmitter to apply parameters suitable for such a synchronization.

In some embodiments, the power receiver may in the first mode of operation be arranged to take actions that are likely to improve the synchronization operation. Indeed, in many embodiments, the power receiver may proceed to only disconnect the load 303 during the foreign object detection time intervals and still keep it connected during the power transfer time intervals, i.e. there may be no specific differences in the load operation between the first and the second modes. However, the power receiver may be arranged to modify the synchronization operation and mays specifically communicate with the power transmitter to change parameters of the power transfer signal that will facilitate synchronization by the power receiver.

As a specific example, the power receiver controller 301 may be arranged to communicate with the power transmitter to cause this to change the signal levels of the power transfer signal/generated electromagnetic field such that the difference between the power transfer time intervals and the foreign object detection time intervals are increased thereby facilitating detection of the transitions between the different types of intervals.

For example, as previously described, the power receiver controller 301 is arranged to implement a power control loop and to transmit power control messages to the power transmitter. The power transmitter adapts the signal level during the power transfer time intervals in response to these messages, and the power receiver controller 301 is arranged to generate the requests to cause the extracted power to match that required by the power receiver to feed the load 303.

However, if the power receiver is in the second mode (and normal power transfer is ongoing) and the reliability measure falls below a threshold indicating that the synchronization is no longer sufficiently accurate (e.g. because the levels in the foreign object detection time interval and the power transfer time interval are almost equal), the mode controller 313 may switch the power receiver to the first mode of operation in which it changes the operation for the power control messages such that they are generated to result in a large(r) difference between the foreign object detection time intervals and the power transfer time intervals. Thus, even if the power level is sufficient (or too high) for the power receiver to power the load 303, the power receiver controller 301 may continue to transmit power up requests in order to increase the difference between the signal levels for the foreign object detection time intervals and the power transfer time intervals. For example, power up requests may be transmitted until the detected difference is sufficiently high and the power control may then be continued to maintain this level. Thus, in such an example, the power control operation may switch from being based on parameters of the power transfer operation (the required power level) to be based on parameters of the synchronization (the signal level step between the time intervals).

Such an approach may be particularly advantageous for maintaining reliable synchronization throughout the power transfer phase, and may be applicable e.g. to embodiments where no initial synchronization phase is performed when entering the power transfer phase. For example, the power transfer phase may simply start based on initial parameter values determined during the preparation phase without requiring any initial fine tuning of the synchronization. The power transfer phase may accordingly be started directly with the power receiver in the second mode of operation. However, if the synchronization during the power transfer phase is detected to become inaccurate/unreliable, the mode controller 313 may switch the power receiver to the first mode of operation to perform (re)synchronization.

Such an approach will typically only be applied when the connected load does not extract a lot of power (has a relatively high resistive value).

Indeed, directly starting the power transfer phase in the second mode of operation is that for a high power demand, the power receiver seeks to rapidly control the power transmitter to provide a high signal level, because otherwise the voltage at the power receiver may drop below a level at which it can operate. The external load level is normally not under the control of the power receiver; the receiver has to deal with the given load.

The approach may provide particularly efficient operation in the example where the synchronization during the power transfer phase is performed based on detecting signal level variations between the foreign object detection time intervals and the power transfer time intervals.

As another example, in some embodiments, the power receiver controller 301 may be arranged to limit a rate of change for power levels when in the first mode of operation to a lower level than when in the second mode of operation. For example, when the power receiver is operating during "normal" power transfer and in the second mode of operation, the power receiver may transmit power control messages which allow a fast adaptation of the power control loop so that it can follow fast variations. However, if the reliability measure indicates that the synchronization is not reliable, e.g. due to a determination that the signal level changes between the power transfer time intervals and foreign object detection time intervals is low, the mode controller 313 may switch the power receiver to the first mode of operation in which the rate of change may be substantially limited. Specifically, the power control loop dynamics may be changed to implement a very slow loop and may only gradually increase the power level in order to allow time for a re-synchronization and to prevent an overvoltage condition at the power receiver when the load is disconnected that may otherwise have been caused by a fast increase of the power signal while the synchronization may still be unreliable. In many embodiments, the adaptation may be asymmetric such that fast reduction in the power level is supported but only very slow increases are possible.

In other embodiments, the power receiver controller 301 may in such a situation be arranged to restrict the power transmitter to provide a maximum power signal level when switching to the first mode, i.e. it may allow a higher power signal level when in the second mode than when in the first mode of operation.

In the system, the power receiver may when operating in the second mode be arranged to disconnect the load 303 shortly after the start of the foreign object detection time intervals and it may be arranged to reconnect it shortly before the end of the foreign object detection time intervals with both the connection and the disconnection being determined based on the local time reference as synchronized to the repeating time frame of the power transfer signal. For example, the start and end times of the foreign object detection time intervals may be determined and the switch times for disconnecting and reconnecting may be set to these but typically with a short predetermined time offset to ensure that the transitions always occur within the foreign object detection time intervals.

In some embodiments, the power receiver may comprise a current restrictor arranged to restrict the current to the load when reconnecting this. Specifically, the current restrictor may be arranged to limit the rate of change for the current to a given limit such that only a gradual increase is achieved instead of risking a large inrush current when reconnecting the load 303 (which e.g. may occur if the load 303 includes a large capacitive component). The current restrictor may e.g. be implemented in the form of an inductor.

Figure 8:
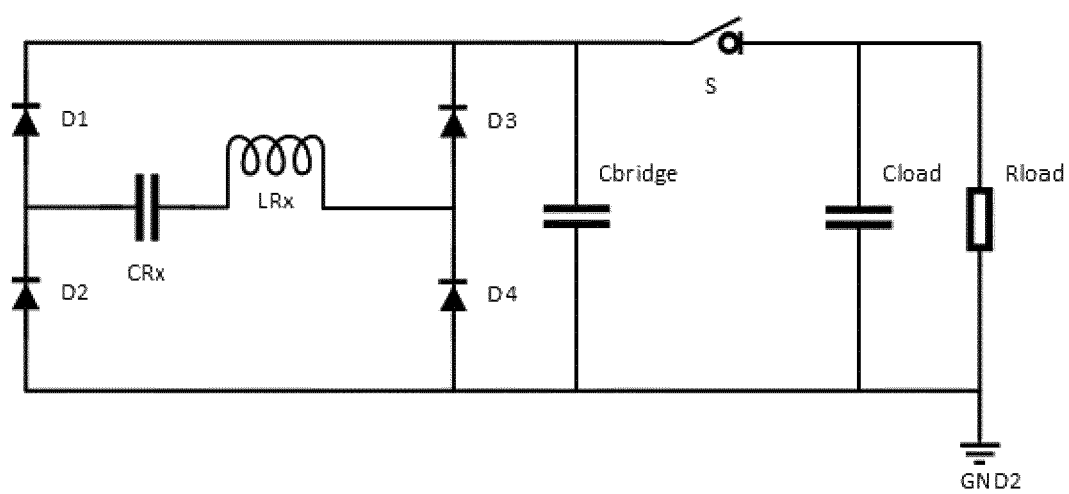
FIG. 8 illustrates an example of elements of a power receiver in accordance with some embodiments of the invention.
Figure 9:
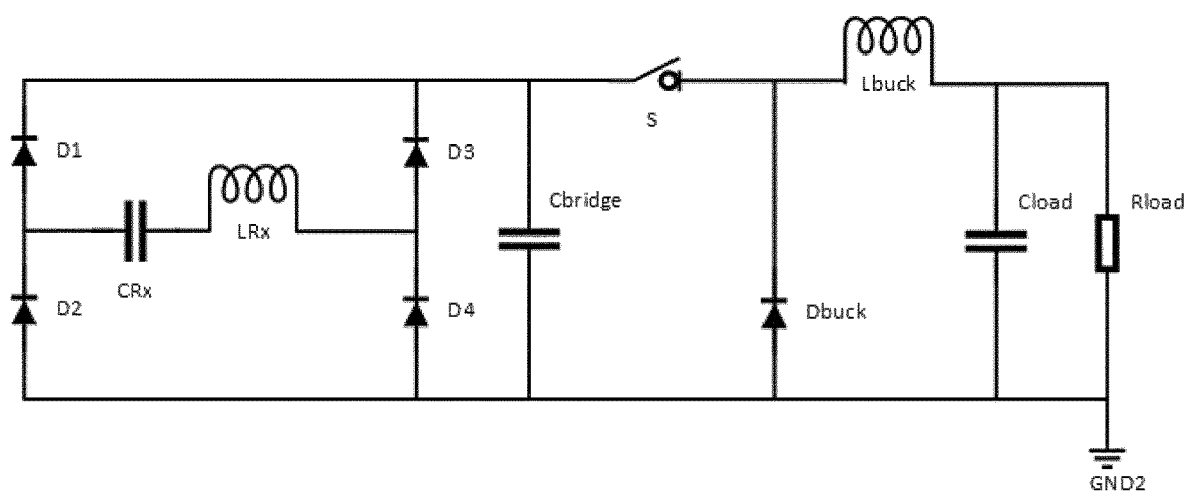
FIG. 9 illustrates an example of elements of a power receiver in accordance with some embodiments of the invention.

FIGS. 8-10 may be used to illustrate circuit examples for such an approach with the load 303 having both a resistive load component Rload and a significant capacitive load Cload.

In the examples, the load 303 is disconnected at the start of the foreign object detection time interval corresponding to the switch S opening. In the example, the voltage over Cbridge stays constant during the foreign object detection time interval. However, the voltage over Cload reduces due to Rload (effectively Cload may act as an energy reservoir powering the load represented by Rload during the time the load 303 is disconnected, i.e. during the foreign object detection time interval).

In this situation, if no current restriction is included as in the example of FIG. 8, a relatively high inrush current may flow from Cbridge to Cload to re-balance these voltages.

A solution addressing such an issue is to restrict the current change. e.g. by including an inductor between the capacitors Cbridge and Cload to avoid such surges. Another, and often preferred approach may be to implement a buck converter using S as the switch element of the buck converter. Such an example is given in FIG. 9 where Dbuck and Lbuck are introduced to create the buck converter. In many embodiments, this may not substantially increase complexity as such components are often already in place since most applications require some post control of the voltage across the load Rload anyhow.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

It will be appreciated that the reference to a preferred value does not imply any limitation beyond it being the value determined in the foreign object detection initialization mode, i.e. it is preferred by virtue of it being determined in the adaptation process. The references to a preferred value could be substituted for references to e.g. a first value.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A power receiver comprising:
   a synchronizer circuit,
      wherein the synchronizer circuit is arranged to synchronize a local time reference to a repeating time frame,
      wherein the repeating time frame comprises at least one power transfer interval and at least one foreign object detection interval;
   a load controller circuit,
      wherein the load controller circuit is arranged to disconnect a load,
      wherein the load is disconnected during at least a portion of the at least one foreign object detection interval,
      wherein the load is disconnected during at least a portion of a power transfer phase,
      wherein a timing of the disconnecting is dependent on the local time reference; and
   a mode controller circuit, wherein the mode controller circuit is arranged to switch during a power transfer interval between a first operational mode and a second operational mode in response to a reliability measure of the synchronization,
      wherein first power transfer parameters are used in the first operational mode and the second power transfer parameters are used in the second operational mode,
      wherein the first power transfer parameters are different from the second power transfer parameters,
      wherein the power receiver receives wireless power from a power transfer signal,
      wherein the power transfer signal is transmitted from a power transmitter during the power transfer phase.

2. The power receiver of claim 1,
   wherein the synchronizer circuit is arranged to perform a synchronization of the local time reference to the repeating time frame when entering the power transfer phase,
   wherein the mode controller circuit is arranged to control the power receiver to operate in the first operational mode when entering the power transfer phase,
   wherein the mode controller circuit is arranged to switch the power receiver to the second operational mode in response to a detection that the reliability measure for the synchronization exceeds a threshold.

3. The power receiver of claim 2, further comprising a signal level controller circuit,
   wherein the signal level controller circuit is arranged to transmit to the power transmitter signal level requests for the power transfer signal,
   wherein the signal level controller circuit is arranged to control the signal level of the power transfer signal during the at least one power transfer interval to differ from a signal level of the power transfer signal during the at least one foreign object detection interval when in the first operational mode
   wherein the synchronizer circuit is arranged to synchronize in response to signal variations between the at least one power transfer interval and the at least one foreign object interval.

4. The power receiver of claim 1, wherein the synchronizer circuit is arranged to determine the reliability measure of the synchronization in response to a duration in the first operational mode.

5. The power receiver claim 1, further comprising an initiator circuit,
   wherein the initiator circuit is arranged to determine a set of parameters for the at least one foreign object detection interval by communicating with the power transmitter prior to entering the power transfer phase,
   wherein the set of parameters comprises at least one of a duration of the at least one foreign object detection interval, an interval between two of the foreign object detection intervals a signal level for the at least one foreign object detection interval.

6. The power receiver of claim 5, wherein the synchronizer circuit is arranged to perform the synchronization based on the set of parameters.

7. The power receiver of claim 5, wherein the synchronizer circuit is arranged to determine the reliability measure in response to a comparison of a timing parameter for the at least one foreign object detection interval determined from the local time reference and corresponding timing parameter of the set of parameters.

8. The power receiver of claim 1, wherein the power receiver is arranged to control the power transmitter so as to limit a signal level of the power transfer signal to a level which is lower when in the first operational mode than when in the second operational mode.

9. The power receiver of claim 1, wherein the load controller circuit is arranged to disconnect a load from the power transfer signal during the at least one power transfer interval when in the first operational mode but not when in the second operational mode.

10. The power receiver of claim 1, further comprising a power level controller circuit,
wherein the power level controller circuit is arranged to transmit power level requests for the power transfer signal to the power transmitter,
wherein the power level controller circuit is arranged to limit a rate of change for power levels when in the first operational mode to a lower level than when in the second operational mode.

11. The power receiver of claim 1, wherein the synchronizer circuit is arranged to determine the reliability measure of for the synchronization in response to a comparison of signal levels for the power transfer signal during the at least one power transfer interval and the at least one foreign object detection interval.

12. The power receiver of claim 1, wherein the mode controller circuit is arranged to switch the power receiver from the second operational mode to the first operational mode in response to detecting that the reliability measure of the synchronization is below a threshold.

13. The power receiver of claim 1,
wherein the load controller circuit is arranged to reconnect the load during the foreign object detection interval during at least a portion of the power transfer phase,
wherein a time to reconnect depends on the local time reference.

14. The power receiver of claim 13, further comprising a current restrictor circuit, wherein the current restrictor circuits is arranged to restrict a current to the load when reconnecting the load.

15. A method of operating power receiver, wherein the power receiver is arranged to receive a wireless power from a power transfer signal from a power transmitter during a power transfer phase, the method comprising:
receiving the wireless power from a power transfer signal;
synchronizing a local time reference to a repeating time frame, wherein the repeating time frame comprises at least one power transfer interval and at least one foreign object detection interval;
disconnecting a load during at least a portion of the at least one foreign object detection interval during at least a portion of the power transfer phase, wherein a timing of the disconnecting is dependent on the local time reference; and
switching between a first operational mode and a second operational mode for the at least one power transfer interval in response to a reliability measure of for the synchronization,
wherein first power transfer parameters are used in the first operational mode and second power transfer parameters are used in the second operational mode.

16. The method of claim 15,
wherein the synchronizing synchronizes the local time reference to the repeating time frame when entering the power transfer phase,
wherein the switching operates the power receiver in the first operational mode when entering the power transfer phase,
wherein the switching operated the power receiver in the second operational mode in response to a detection that the reliability measure of for the synchronization exceeds a threshold.

17. The method of claim 16, further comprising:
transmitting to the power transmitter signal level requests for the power transfer signal; and
controlling the signal level of the power transfer signal during the at least one power transfer interval to differ from a signal level of the power transfer signal during the at least one foreign object detection interval when in the first operational mode,
wherein the synchronizing synchronizes in response to signal variations between the at least one power transfer interval and the at least one foreign object detection interval.

18. The method of claim 15, wherein the synchronizing determines the reliability measure of for the synchronization in response to a duration in the first operational mode.

19. The method of claim 15, further comprising determining a set of parameters for the at least one foreign object detection interval by communicating with the power transmitter prior to entering the power transfer phase;
wherein the set of parameters comprises at least one of a duration of the at least one foreign object detection interval, an interval between two of the foreign object detection intervals a signal level for the at least one foreign object detection interval.

20. A computer program stored on a non-transitory medium, wherein the computer program when executed on a processor performs the method as claimed in claim 15.

* * * * *